(12) United States Patent
Wu et al.

(10) Patent No.: US 9,967,577 B2
(45) Date of Patent: May 8, 2018

(54) ACCELERATION INTERFACE FOR VIDEO DECODING

(71) Applicant: Microsoft Technology Licensing, LLC, Redmond, WA (US)

(72) Inventors: Yongjun Wu, Redmond, WA (US); Shyam Sadhwani, Bellevue, WA (US); Abo Talib Mahfoodh, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 240 days.

(21) Appl. No.: 14/841,689

(22) Filed: Aug. 31, 2015

(65) Prior Publication Data
US 2017/0064313 A1 Mar. 2, 2017

(51) Int. Cl.
*H04N 19/119* (2014.01)
*H04N 19/124* (2014.01)
*H04N 19/172* (2014.01)
*H04N 19/33* (2014.01)
*H04N 19/70* (2014.01)
(Continued)

(52) U.S. Cl.
CPC ........... *H04N 19/33* (2014.11); *H04N 19/119* (2014.11); *H04N 19/124* (2014.11); *H04N 19/172* (2014.11); *H04N 19/42* (2014.11); *H04N 19/46* (2014.11); *H04N 19/70* (2014.11); *H04N 19/43* (2014.11); *H04N 19/61* (2014.11); *H04N 19/91* (2014.11)

(58) Field of Classification Search
CPC .................................................... H04N 19/33
USPC ........................................................ 375/240
See application file for complete search history.

(56) References Cited

U.S. PATENT DOCUMENTS

| 8,487,943 B2 * | 7/2013 | Blinzer ................. G06F 1/3203 345/502 |
| 2013/0156101 A1 * | 6/2013 | Lu .......................... H04N 19/30 375/240.12 |

FOREIGN PATENT DOCUMENTS

CN 201435783 3/2010

OTHER PUBLICATIONS

Sullivan et al. —DirectX Video Acceleration Specification for Windows Media Video v8, v9 and vA Decoding (Including SMPTE 421M "VC-1"); DirectX Video Acceleration, Aug. 1, 2010.*
(Continued)

*Primary Examiner* — Christopher S Kelley
*Assistant Examiner* — Asmamaw G Tarko
(74) *Attorney, Agent, or Firm* — Klarquist Sparkman, LLP

(57) ABSTRACT

A host decoder and accelerator communicate across an acceleration interface. The host decoder receives at least part of a bitstream for video, and it manages certain decoding operations of the accelerator across the acceleration interface. The accelerator receives data from the host decoder across the acceleration interface, then performs decoding operations. For a given frame, settings based on an uncompressed frame header can be transferred in a different buffer of the acceleration interface than a compressed frame header and compressed frame data. Among other features, the host decoder can assign settings used by the accelerator that override values of bitstream syntax elements, can assign surface index values used by the accelerator to update reference frame buffers, and can handle skipped frames without invoking the accelerator. Among other features, the accelerator can use surface index values to update reference frame buffers, and can handle changes in spatial resolution at non-key frames.

29 Claims, 17 Drawing Sheets

(51) Int. Cl.
*H04N 19/46* (2014.01)
*H04N 19/42* (2014.01)
*H04N 19/61* (2014.01)
*H04N 19/91* (2014.01)
*H04N 19/43* (2014.01)

(56) References Cited

OTHER PUBLICATIONS

Artigas, "Playback Tutorial 8: Hardware-Accelerated Video Decoding," GStreamer SDK, 3 pp. (Jul. 2012).
Bankoski et al, "VP8 Data Format and Decoding Guide," 304 pp. (2011).
Brinkmann, "Hardware Accelerated H.264 Playback Coming to Firefox 23," downloaded from the World Wide Web, 6 pp. (May 2013).
Chen et al., "Implementation of H.264 Encoder and Decoder on Personal Computers," *Journal of Visual Comm. and Image Representation*, 19 pp. (Apr. 2006).
Doom9's Forum, "How VP9 Works, Technical Details & Diagrams," downloaded from the World Wide Web, 15 pp. (Oct. 2013).
Fotiades, "Remote Ray Tracing for Mobile Applications," Rochester Institute of Technology, 37 pp. (May 2015).
Gao, "[FFmpeg-devel] [Patch] Libavcodec: Add H.264 DXVA2 Decoder to FFmpeg," downloaded from the World Wide Web, 2 pp. (Dec. 2012).
Google Project Housing, "Webm," downloaded from the World Wide Web, 1 p. (downloaded on Aug. 28, 2015).
Grange et al., "A VP9 Bitstream Overview," downloaded from the World Wide Web, 14 pp. (Feb. 2013).
Intel Corp., "Intel's Next Generation Integrated Graphics Architecture—Intel® Graphics Media Accelerator X3000 and 3000," 14 pp. (Jul. 2006).
Ittiam Systems, "VP9," downloaded from the World Wide Web, 2 pp. (downloaded on Aug. 28, 2015).
Kowaliski, "New Intel IGP Drivers Add H.265, VP9 Hardware Decode Support," *The Tech Report*, 5 pp. (Jan. 2015).
Microsoft Corporation, "DirectX Video Acceleration 2.0," downloaded from the World Wide Web, 65 pp. (downloaded on Aug. 28, 2015).
Microsoft Corporation, "DXVA2_ConfigPictureDecode Structure," downloaded from the World Wide Web, 5 pp. (downloaded on Aug. 28, 2015).
Microsoft Corporation, "IDirectXVideoDecoder Interface," downloaded from the World Wide Web, 19 pp. (Mar. 2012).
Mukherjee et al., "A Technical Overview of VP9: The Latest Royalty-Free Video Codec from Google," downloaded from the World Wide Web, 44 pp. (downloaded on Aug. 28, 2015).
Puri, "Enabling HEVC: Intel® Media Server Studio 2015," Intel Whitepaper, V1.45, 85 pp. (Apr. 2015).
Sardella, "Using H.264/AVC DirectX* Video Acceleration With the Intel® G45/GM45 Express Chipsets," Intel Whitepaper, Revision 1, 22 pp. (Apr. 2009).
Shafique et al., "Low Power Design of the Next-Generation High Efficiency Video Coding," *IEEE Design Automation Conference*, pp. 274-281 (Jan. 2014).
Sullivan, "DirectX Video Acceleration Specification for H.264/AVC Decoding," 66 pp. (Dec. 2007—updated Dec. 2010).
Sullivan et al., "DirectX Video Acceleration Specification for High Efficiency Video Coding (HEVC)," 32 pp. (Aug. 2013).
Sullivan et al., "DirectX Video Acceleration Specification for H.264/MPEG-4 AVC Multiview Video Coding (MVC), Including the Stereo High Profile," 17 pp. (Mar. 2011).
Sullivan et al., "DirectX Video Acceleration (DXVA) Specification for H.264/MPEG-4 Scalable Video Coding (SVC) Off-Host VLD Mode Decoding," 24 pp. (Jun. 2012).
Sullivan et al., "Microsoft DirectX VA: Video Acceleration API/DDI," 88 pp. (2001).
Voica, "Imagination Makes Efficient VP9 Video Decode a Reality for All Mainstream Devices," *Imagination Blog*, 6 pp. (Feb. 2014).
Wang, "H.264 Baseline Video Implementation on the CT3400 Multi-Core DSP," Cradle Technologies, 15 pp. (2006).
International Preliminary Report on Patentability dated Aug. 17, 2017, from International Patent Application No. PCT/US2016/044148, 19 pp.
SMPTE 421M, "VC-1 Compressed Video Bitstream Format and Decoding Process," 493 pp. (Feb. 2006).
Sullivan, "DirectX Video Acceleration Specification for Windows Media Video v8, v9, and vA Decoding (Including SMPTE 421M "VC-1")," 101 pp. (Dec. 2007—updated Aug. 2010).
Sullivan, "DirectX Video Acceleration Specification for Windows Media Video v8, v9, and vA Decoding (Including SMPTE 421M "VC-1")," 102 pp. (Dec. 2007—updated Aug. 2010 and Aug. 2012).
Written Opinion of the International Preliminary Examining Authority dated Apr. 5, 2017, from International Patent Application No. PCT/US2016/044148, 8 pp.
International Search Report and Written Opinion dated Dec. 21, 2016, from International Patent Application No. PCT/US2016/044148, 20 pp.
ISO/IEC, "Proposed Text for 14496-31 (VCB) CD," ISO/IEC JTC1/SC29/WG11 MPEG2014/M 33082, 95 pp. (Mar. 2014).
Mukherjee et al., "The Latest Open-Source Video Codec VP9—An Overview and Preliminary Results," IEEE Picture Coding Symp., pp. 390-393 (Dec. 2013).
Sullivan, "DirectX Video Acceleration Specification for Windows Media Video v8, v9, and vA Decoding (Including SMPTE 421M "VC-1")," 84 pp. (Dec. 2007—updated Aug. 2010).

* cited by examiner

FIG. 1

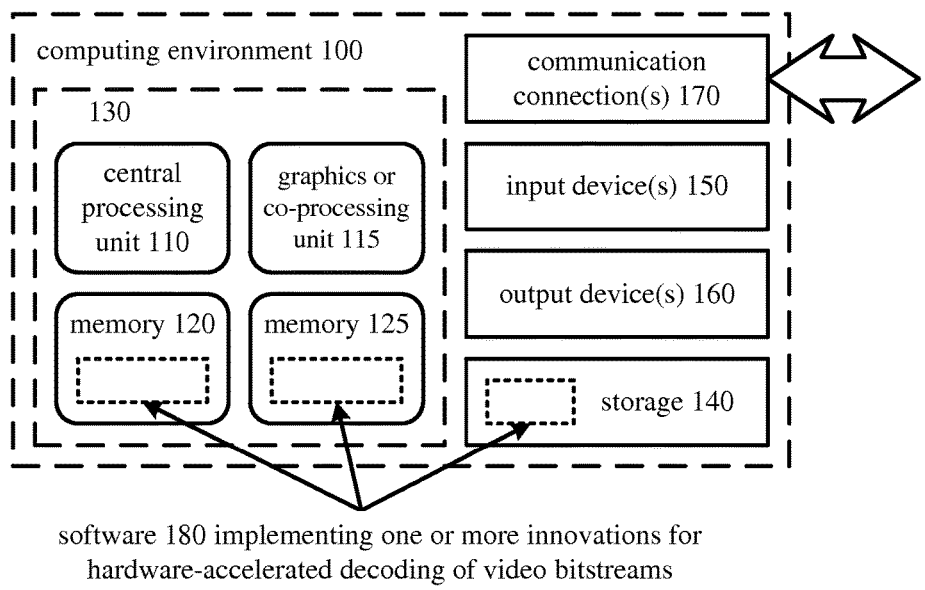

software 180 implementing one or more innovations for
hardware-accelerated decoding of video bitstreams

FIG. 2

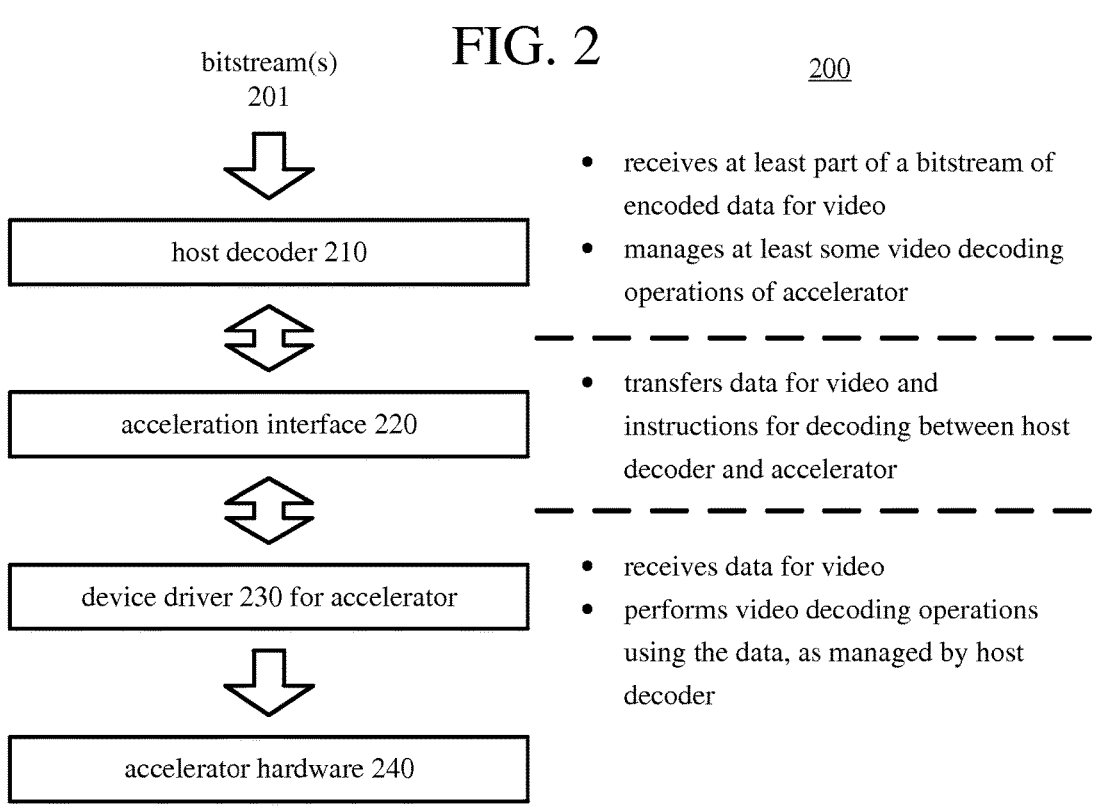

- receives at least part of a bitstream of encoded data for video
- manages at least some video decoding operations of accelerator

- transfers data for video and instructions for decoding between host decoder and accelerator

- receives data for video
- performs video decoding operations using the data, as managed by host decoder

FIG. 3          300

```
typedef struct _DXVA_PicEntry_VPx {
    union {
        struct {
        UCHAR Index7Bits      : 7;
        UCHAR AssociatedFlag  : 1;
        };
    UCHAR bPicEntry;
    };
} DXVA_PicEntry_VPx, *LPDXVA_PicEntry_VPx;
```

FIG. 8          800

```
typedef struct _DXVA_Slice_VPx_Short {
    UINT     BSNALunitDataLocation;
    UINT     SliceBytesInBuffer;
    USHORT   wBadSliceChopping;
} DXVA_Slice_VPx_Short, *LPDXVA_Slice_VPx_Short;
```

FIG. 9          900

```
typedef struct _DXVA_Status_VPx {
    UINT   StatusReportFeedbackNumber;
    DXVA_PicEntry_VPx CurrPic;
    UCHAR  bBufType;
    UCHAR  bStatus;
    UCHAR  bReserved8Bits;
    USHORT wNumMbsAffected;
} DXVA_Status_VPx, *LPDXVA_Status_VPx;
```

```
typedef struct _DXVA_PicParams_VP9 {
    DXVA_PicEntry_VPx    CurrPic;
    UCHAR       version;
    UINT        width;
    UINT        height;
    UCHAR       frame_type;
    UCHAR       error_resilient_mode;
    UCHAR       show_frame;
    UCHAR       refresh_frame_context;
    UCHAR       frame_parallel_decoding_mode;
    UCHAR       frame_context_idx;
    UCHAR       intra_only;
    UCHAR       reset_frame_context;
    UCHAR       allow_high_precision_mv;
    UCHAR       interp_filter;
    DXVA_PicEntry_VPx    ref_frame_map[8];
    DXVA_PicEntry_VPx    frame_refs[3];
    CHAR        ref_frame_sign_bias[3];
    CHAR        filter_level;
    CHAR        sharpness_level;
    CHAR        mode_ref_delta_enabled;
    CHAR        mode_ref_delta_update;
    CHAR        ref_deltas[4];
    CHAR        mode_deltas[2];
    SHORT       base_qindex;
    CHAR        y_dc_delta_q;
    CHAR        uv_dc_delta_q;
    CHAR        uv_ac_delta_q;
    DXVA_segmentation_VP9  stVP9Segments;
    UCHAR       log2_tile_cols;
    UCHAR       log2_tile_rows;
    USHORT      uncompressed_header_size_byte_aligned;
    USHORT      first_partition_size;
    USHORT      ReservedBits1;
    USHORT      ReservedBits2;
    UINT        StatusReportFeedbackNumber;
} DXVA_PicParams_VP9, *LPDXVA_PicParams_VP9;
```

FIG. 5    500

```
typedef struct _segmentation_VP9 {
    UCHAR enabled;
    UCHAR update_map;
    UCHAR temporal_update;
    UCHAR tree_probs[7];
    UCHAR pred_probs[3];
    UCHAR abs_delta;
    SHORT feature_data[8][4];
    UCHAR feature_mask[8];
} DXVA_segmentation_VP9;
```

FIG. 6a    600

```
typedef struct _DXVA_PicParams_VP8 {
    DXVA_PicEntry_VPx      CurrPic;
    UCHAR       frame_type;
    UCHAR       version;
    UCHAR       show_frame;
    UINT        first_part_size;
    UINT        width;
    UINT        height;
    UCHAR       clamp_type;
    UCHAR       segmentation_enabled;
    DXVA_segmentation_VP8  stVP8Segments;
    UCHAR       filter_type;
    UCHAR       filter_level;
    UCHAR       sharpness_level;
    UCHAR       mode_ref_lf_delta_enabled;
    UCHAR       mode_ref_lf_delta_update;
    CHAR        ref_lf_deltas[4];
    CHAR        mode_lf_deltas[4];
    UCHAR       log2_nbr_of_dct_partitions;
    UCHAR       base_qindex;
    CHAR        y1dc_delta_q;
```

FIG. 6b 600
(cont.)

```
        CHAR            y2dc_delta_q;
        CHAR            y2ac_delta_q;
        CHAR            uvdc_delta_q;
        CHAR            uvac_delta_q;
        UCHAR           log2_nbr_of_dct_partitions;
        DXVA_PicEntry_VPx   alt_fb_idx;
        DXVA_PicEntry_VPx   gld_fb_idx;
        DXVA_PicEntry_VPx   lst_fb_idx;
        UCHAR           ref_frame_sign_bias_golden;
        UCHAR           ref_frame_sign_bias_altref;
        UCHAR           refresh_entropy_probs;
        UCHAR           vp8_coef_update_probs[4][8][3][11];
        UCHAR           mb_no_coeff_skip;
        UCHAR           prob_skip_false;
        UCHAR           prob_intra;
        UCHAR           prob_last;
        UCHAR           prob_golden;
        UCHAR           intra_16x16_prob[4];
        UCHAR           intra_chroma_prob[3];
        UCHAR           vp8_mv_update_probs[2][19];
        USHORT          ReservedBits1;
        USHORT          ReservedBits2;
        UINT            StatusReportFeedbackNumber;
    } DXVA_PicParams_VP8, *LPDXVA_PicParams_VP8;
```

```
    typedef struct _segmentation_VP8 {
        UCHAR update_mb_segmentation_map;
        UCHAR update_mb_segmentation_data;
        UCHAR mb_segement_abs_delta;
        CHAR  segment_feature_data[2][4];
        UCHAR mb_segment_tree_probs [3];
    } DXVA_segmentation_VP8;
```

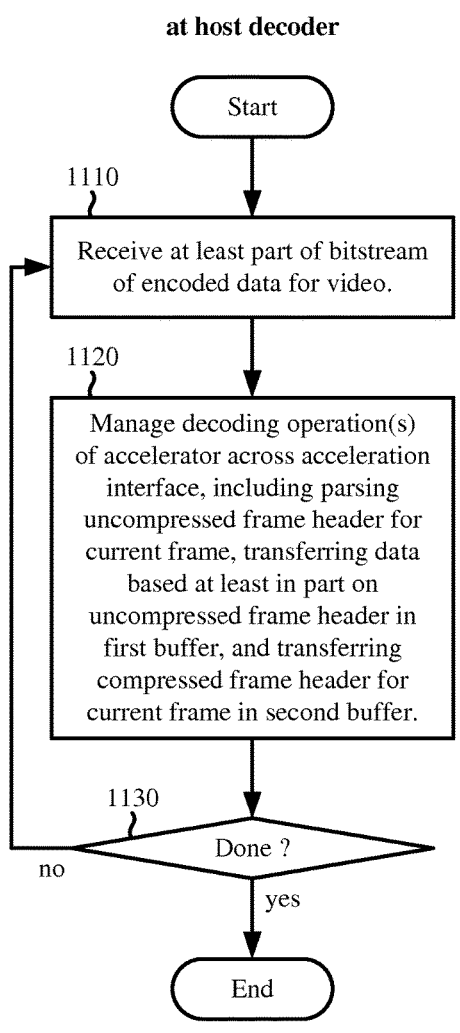
FIG. 11    1100
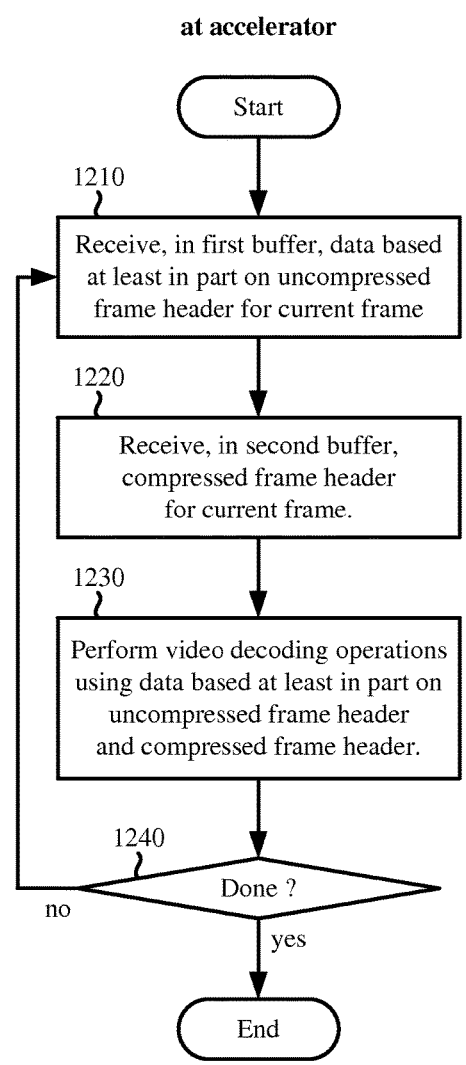
FIG. 12    1200

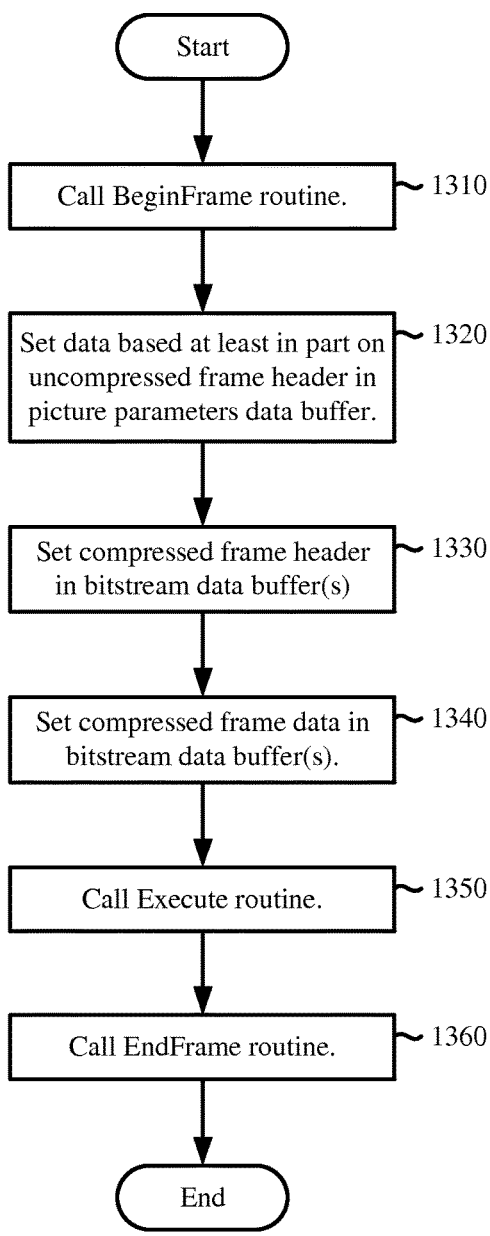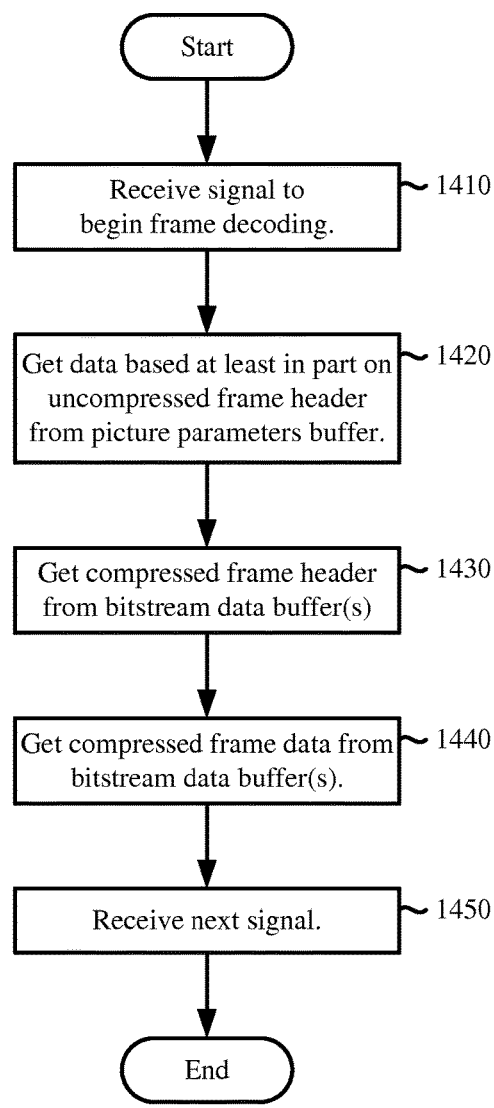

FIG. 18b second example 1850 of managing updates to reference frame buffers host decoder 1851 assign surface index values that indicate reference frame assignments receive syntax elements from bitstream that specify updates to reference frame buffers transfer surface index values

| | |
|---|---|
| *031 | --- |
| 081 | 090 |
| *091 | 088 |
| 089 | |

*000 reference frames 1820 available at time *t*+1 for decoding of frame *t*+1 and subsequent frame(s), including frames (000, 031, 091) used for decoding of frame *t*+1 process updates to reference frame buffers (*e.g.*, swaps, removals, additions) using the surface index values that indicate reference frame assignments

| | |
|---|---|
| 000 | *031 |
| 081 | 082 |
| 085 | 088 |
| *089 | *090 | reference frames 1810 available at time *t* for decoding of current frame *t* and subsequent frame(s), including frames (031, 089, 090) used for decoding of current frame accelerator 1852

FIG. 19    1900
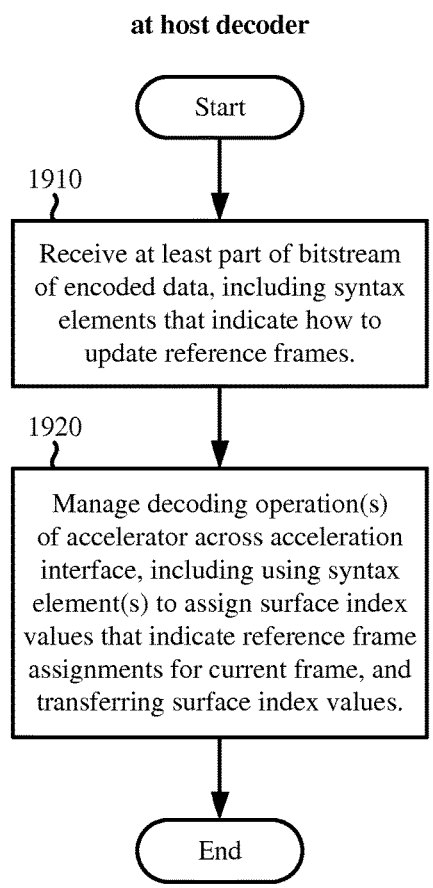
FIG. 20    2000
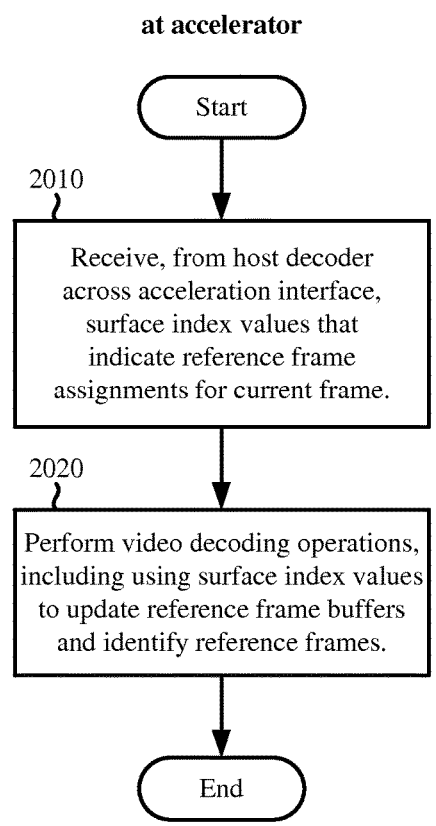

FIG. 21a        series of frames in decoding order
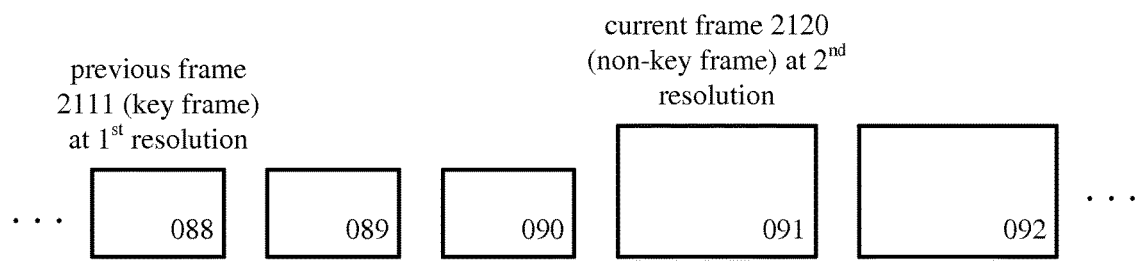
FIG. 21b        decoding of current frame 2120 using
                motion compensation relative to
                scaled reference frames 2130
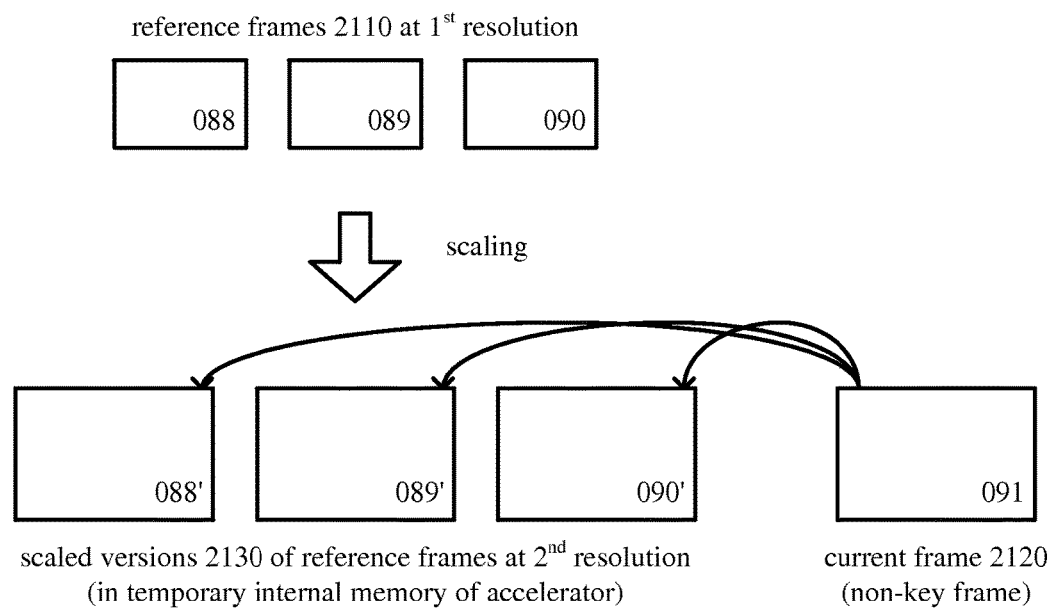

FIG. 22    2200
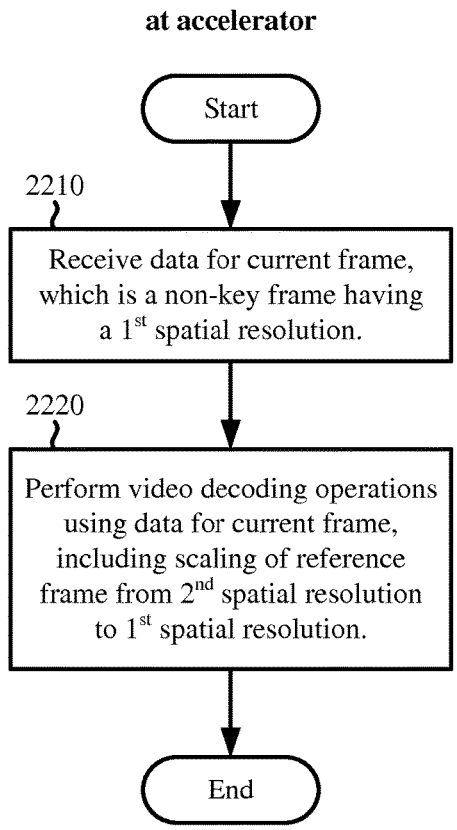
FIG. 23    2300
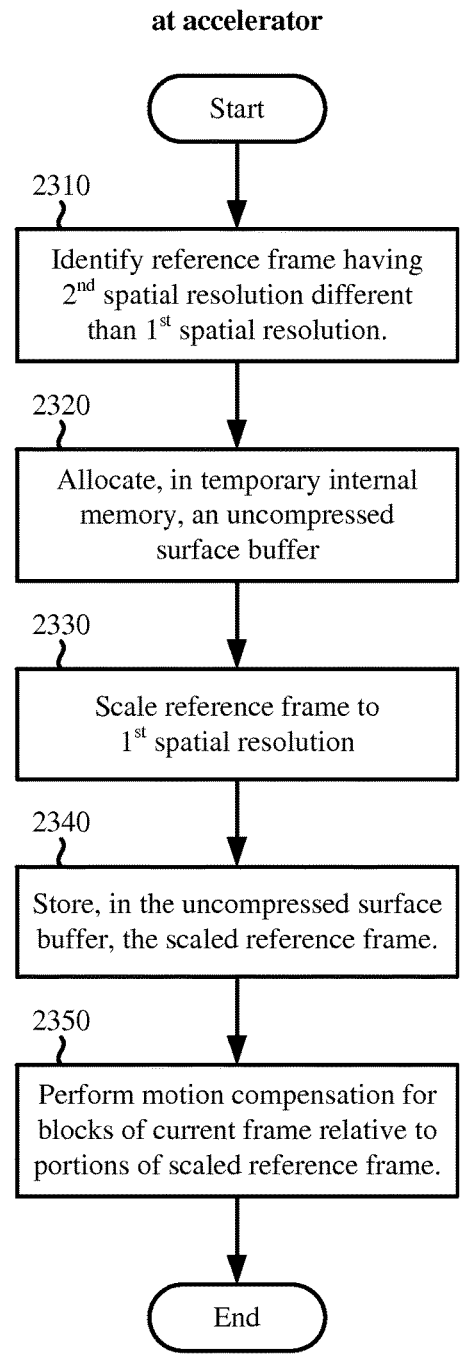

ACCELERATION INTERFACE FOR VIDEO DECODING

BACKGROUND

When video is streamed over the Internet and played back through a Web browser or media player, the video is delivered in digital form. Digital video is also used when video is delivered through many broadcast services, satellite services and cable television services. Real-time videoconferencing often uses digital video, and digital video is used during video capture with most smartphones, Web cameras and other video capture devices.

Digital video can consume an extremely high amount of bits. The number of bits that is used per second of represented video content is known as the bit rate. Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the H.261, H.262 (MPEG-2 or ISO/IEC 13818-2), H.263, H.264 (AVC or ISO/IEC 14496-10), and H.265 (HEVC) standards, the MPEG-1 (ISO/IEC 11172-2) and MPEG-4 Visual (ISO/IEC 14496-2) standards, and the SMPTE 421M (VC-1) standard. Various other formats have also been adopted, including VPx formats (e.g., VP6, VP8, VP9). In particular, decoding according to the VP8 format and decoding according to the VP9 format are often used to play back encoded video that is offered over the World Wide Web. VP8 and VP9 decoding are also used in some set-top boxes, personal computers, smartphones and other mobile computing devices for playback of encoded video streamed over the Internet or other networks. A video codec standard or format typically defines options for the syntax of an encoded video bitstream, detailing parameters in the bitstream when particular features are used in encoding and decoding. In many cases, a video codec standard or format also provides details about the decoding operations a decoder should perform to achieve correct results in decoding. In some cases, reference software provides an example of correct encoding and/or decoding according to a video codec standard or format.

While some video decoding operations are relatively simple, others are computationally complex. For example, inverse frequency transforms, fractional sample interpolation operations for motion compensation, in-loop deblock filtering, post-processing filtering, color conversion, and video re-sizing can require extensive computation. This computational complexity can be problematic in various scenarios, such as decoding of high-quality, high-bit rate video (e.g., compressed high-definition video).

Thus, some decoders use hardware acceleration to offload certain computationally intensive operations to a graphics processor or other special-purpose hardware. For example, in some configurations, a computer system includes a primary central processing unit ("CPU") as well as a graphics processing unit ("GPU") or other hardware specially adapted for graphics processing or video decoding. A decoder uses the primary CPU as a host decoder to control overall decoding and uses the GPU (or special-purpose decoding hardware) to perform operations that collectively require extensive computation, accomplishing video acceleration. In a typical software architecture for hardware-accelerated video decoding, a host decoder controls overall decoding and may perform some operations such as bitstream parsing using the CPU. The decoder signals control information (e.g., picture parameters, slice parameters) and encoded data to a device driver for an accelerator (e.g., with GPU) across an acceleration interface. Some existing hardware acceleration architectures are adapted for decoding according to standards such as H.264, but they do not address features of decoding according to certain formats such as VP8 and VP9.

SUMMARY

In summary, the detailed description presents innovations in the design and use of a host decoder and accelerator for hardware-accelerated decoding. The host decoder and accelerator communicate across an acceleration interface. In general, the host decoder receives at least part of a bitstream of encoded data for video, and it manages at least some video decoding operations of the accelerator across the acceleration interface. For its part, the accelerator receives data from the host decoder across the acceleration interface, then performs video decoding operations using the data. Hardware-accelerated decoding can reduce power consumption and, in some cases, help make video playback smoother.

According to one aspect of the innovations described herein, a host decoder receives at least part of a bitstream of encoded data for video. The host decoder manages at least some video decoding operations of an accelerator across an acceleration interface. In doing so, the host decoder parses, from the at least part of the bitstream, an uncompressed frame header for a current frame of the video. To the accelerator across the acceleration interface, the host decoder transfers data based at least in part on the uncompressed frame header for the current frame and also transfers a compressed frame header (and compressed frame data such as mode data, motion vector data, quantized transform coefficients, and other block data) for the current frame. The data based at least in part on the uncompressed frame header and the compressed frame header can be transferred in different buffers. For example, the data based at least in part on the uncompressed frame header is transferred in a first buffer, with the compressed frame header (and compressed frame data) being transferred in a second buffer that is different than the first buffer. The first buffer can be a picture parameters data buffer, and the second buffer can be a bitstream data buffer.

A corresponding accelerator receives, from a host decoder across an acceleration interface, data based at least in part on an uncompressed frame header for a current frame of video. The data based at least in part on the uncompressed frame header is received in a first buffer. The accelerator also receives, from the host decoder across the acceleration interface, a compressed frame header (and compressed frame data) for the current frame. The accelerator receives the compressed frame header (and compressed frame data) in a second buffer different than the first buffer. For example, the first buffer is a picture parameters data buffer, and the second buffer is a bitstream data buffer. The accelerator performs video decoding operations using the data based at least in part on the uncompressed frame header and the compressed frame header (and compressed frame data) for the current frame.

In many cases, the compressed frame header consumes a significant number of bits, compared to the uncompressed frame header. At the same time, the uncompressed frame header includes values used to control many decoding operations. By separately processing and transferring the uncompressed and compressed portions of the frame header, the host decoder and accelerator can simplify parsing/decoding by the host decoder and limit the size of the first buffer, while effectively providing data that is useful to the accelerator for control of video decoding operations.

According to another aspect of the innovations described herein, a host decoder receives at least part of a bitstream of encoded data for video. The at least part of the bitstream includes syntax elements that indicate how to update reference frame buffers. The host decoder manages at least some video decoding operations of an accelerator across an acceleration interface. In doing so, the host decoder uses at least some of the syntax elements to assign surface index values that indicate reference frame assignments for a current frame of the video. The host decoder transfers, to the accelerator across the acceleration interface, the surface index values that indicate the reference frame assignments for the current frame.

A corresponding accelerator receives, from a host decoder across an acceleration interface, surface index values that indicate reference frame assignments for a current frame of video. The accelerator performs video decoding operations. In doing so, the accelerator uses the surface index values to update reference frame buffers and identify reference frames.

In many cases, by assigning surface index values based on syntax elements in the bitstream, the host decoder can simplify reference frame management and other processing by the accelerator. Also, the host decoder can assign surface index values that override updates indicated by syntax elements in the bitstream, in order to provide error concealment functionality or trick mode functionality (e.g., fast forward, fast reverse, slow forward, slow reverse).

According to another aspect of the innovations described herein, a host decoder receives at least part of a bitstream of encoded data for video. The host decoder manages at least some video decoding operations of an accelerator. In doing so, the host decoder determines settings for decoding of a current frame of the video. At least some of the settings override inconsistent values of syntax elements in the at least part of the bitstream. The host decoder transfers the settings to the accelerator across an acceleration interface.

A corresponding accelerator receives, from a host decoder across an acceleration interface, settings for decoding of a current frame of video. The accelerator performs video decoding operations for the current frame. As part of the decoding, the accelerator uses the settings to control at least some of the video decoding operations for the current frame. At least some of the settings override inconsistent values elsewhere in data for the current frame.

In some cases, the host decoder can use the settings to override redundant or unnecessary decoding operations by the accelerator (e.g., skipping deblock filtering when spatial resolution is low). In other cases, the host decoder can use the settings to provide functionality other than basic decoding (e.g., trick mode processing, error concealment).

According to another aspect of the innovations described herein, an accelerator receives, from a host decoder across an acceleration interface, data for a current frame of video. The current frame is a non-key frame having a first spatial resolution. The accelerator performs video decoding operations using the data for the current frame. In particular, the accelerator identifies a reference frame having a second spatial resolution different than the first spatial resolution. The accelerator also allocates, in temporary internal memory, an uncompressed surface buffer. The accelerator scales the reference frame to the first spatial resolution then stores, in the uncompressed surface buffer, the scaled reference frame. Finally, the accelerator performs motion compensation for at least some blocks of the current frame relative to portions of the scaled reference frame. In this way, the accelerator can handle dynamic changes in spatial resolution during decoding, even when spatial resolution changes at a non-key frame.

According to another aspect of the innovations described herein, a host decoder receives at least part of a bitstream of encoded data for video. The host decoder manages at least some video decoding operations of an accelerator across an acceleration interface. In particular, the host decoder determines that a current frame of the video is skipped. Then, the host decoder causes display of a given previous frame of the video in place of the current frame without invoking the accelerator to decode the current frame. In this way, the host decoder can efficiently provide skipped frame functionality without involving the accelerator in decoding of the current frame.

The innovations can be implemented as part of a method, as part of a computer system configured to perform the method or as part of a tangible computer-readable media storing computer-executable instructions for causing a computer system to perform the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

FIG. 1 is a diagram of an example computer system in which some described innovations can be implemented.

FIG. 2 is a diagram of an example architecture for hardware-accelerated decoding of video bitstreams.

FIGS. 3-9 are pseudocode listings of example data structures for data passed from a host decoder to an accelerator across an acceleration interface.

FIGS. 11 and 12 are flowcharts illustrating generalized techniques for transferring portions of an example video bitstream in data buffers accessible to an accelerator, from the perspectives of a host decoder and the accelerator, respectively.

FIGS. 13 and 14 are flowcharts illustrating example techniques for transferring portions of data for a current frame in data buffers accessible to an accelerator, from the perspectives of a host decoder and the accelerator, respectively.

FIG. 18b is a diagram illustrating an example of managing updates to reference frame buffers in an accelerator based on surface index values.

FIGS. 19 and 20 are flowcharts illustrating generalized techniques for using surface index values to update reference frame buffers, from the perspectives of a host decoder and accelerator, respectively.

FIGS. 21a and 21b are diagrams illustrating an example of scaling of a reference frame when switching spatial resolution at a non-key frame during video decoding.

FIG. 22 is a flowchart illustrating a generalized technique for switching spatial resolution at a non-key frame during video decoding, from the perspective of an accelerator.

FIG. 23 is a flowchart illustrating an example technique for switching spatial resolution at a non-key frame during video decoding, from the perspective of an accelerator.

DETAILED DESCRIPTION

Figure 10:
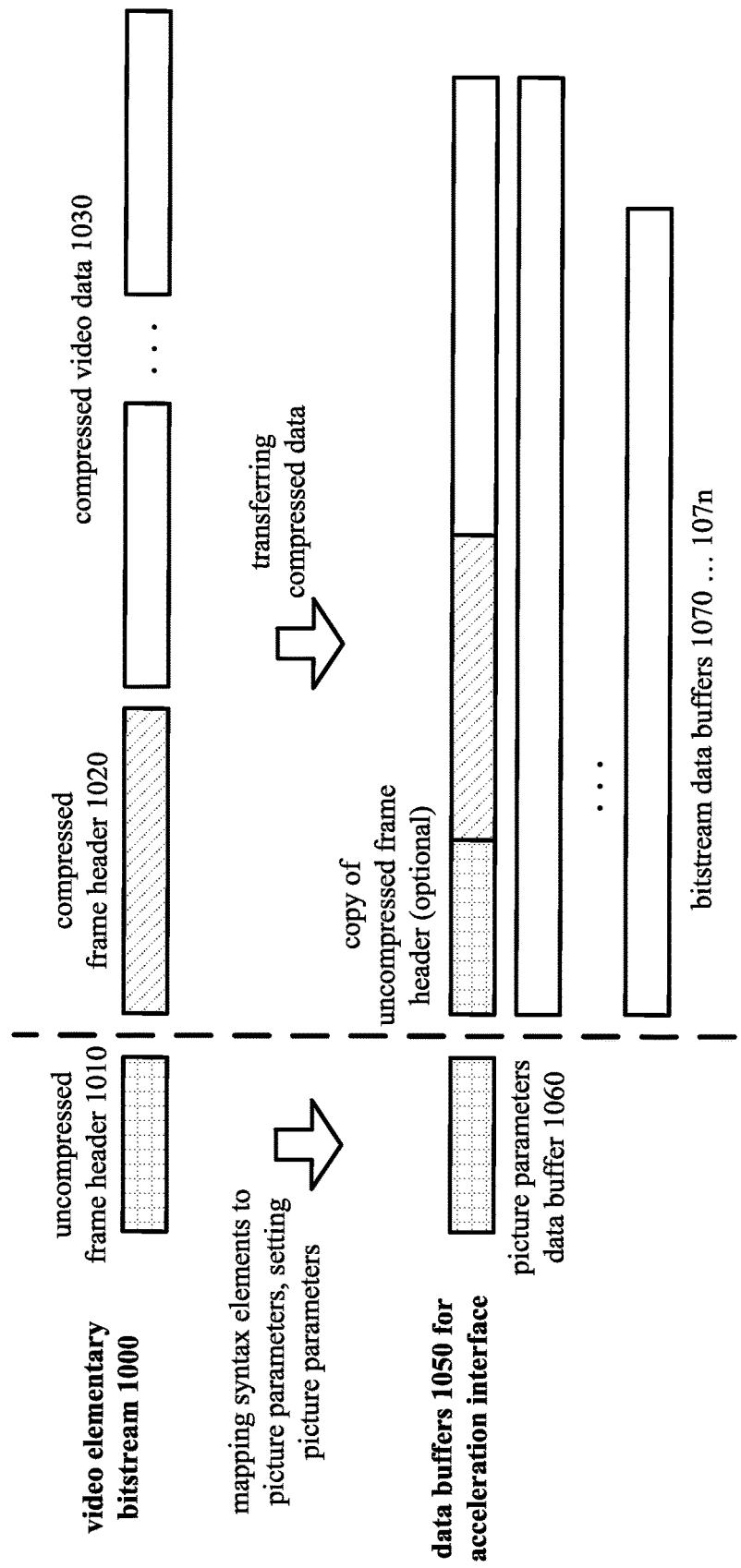
FIG. 10 is a diagram illustrating transfer of portions of an example video bitstream in data buffers accessible to an accelerator.

Innovations described herein relate to aspects of hardware-accelerated decoding of video bitstreams, which include, but are not limited to:
- transferring data based at least in part on an uncompressed frame header in one buffer of an acceleration interface, and transferring a compressed frame header (and compressed frame data such as mode data, motion vector data, quantized transform coefficients, and other block data) in another buffer of the acceleration interface;
- in a host decoder, assigning settings used by an accelerator that override values of bitstream syntax elements, and using such settings in the accelerator;
- in a host decoder, assigning surface index values used by an accelerator based on bitstream syntax elements that indicate how to update reference frame buffers (according to rules), and using such surface index values in the accelerator to update reference frame buffers;
- in an accelerator, handling changes in spatial resolution at non-key frames; and
- in a host decoder, handling skipped frames without invoking an accelerator.

The various aspects of hardware-accelerated decoding that are described herein can be used in combination or separately.

In some examples described herein, the video bitstreams comply with the VP8 format or VP9 format. Innovations described herein can also be used for hardware-accelerated decoding of encoded video conformant to another standard or format. For example, some of the innovations described herein can be used to provide hardware-accelerated decoding for H.264, H.265, SMPTE 421M or another standard or format.

In some examples described herein, hardware-accelerated decoding of video bitstreams generally follows the approach of DirectX Video Acceleration ("DXVA") for H.264 AVC decoding, re-using call patterns, basic data flows, data structures, etc. where possible, and otherwise extending such call patterns, basic data flows, data structures, etc. This provides consistency for vendors who have already implemented other variations of DXVA decoding. Alternatively, innovations described herein are implemented for hardware-accelerated decoding according to another specification of the interface between host decoder and accelerator.

More generally, various alternatives to the examples described herein are possible. Certain techniques described with reference to flowchart diagrams can be altered by changing the ordering of stages shown in the flowcharts, by splitting, repeating or omitting certain stages, etc. Different embodiments use one or more of the described innovations. Some of the innovations described herein address one or more of the problems noted in the background. Typically, a given innovation does not solve all such problems.

I. Example Computer Systems

FIG. 1 illustrates a generalized example of a suitable computer system (100) in which several of the described innovations may be implemented. The computer system (100) is not intended to suggest any limitation as to scope of use or functionality, as the innovations may be implemented in diverse general-purpose or special-purpose computer systems.

With reference to FIG. 1, the computer system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for hardware-accelerated decoding of video bitstreams, in the form of computer-executable instructions suitable for execution by the processing unit(s).

A computer system may have additional features. For example, the computer system (100) includes storage (140), one or more input devices (150), one or more output devices (160), and one or more communication connections (170). An interconnection mechanism (not shown) such as a bus, controller, or network interconnects the components of the computer system (100). Typically, operating system software (not shown) provides an operating environment for other software executing in the computer system (100), and coordinates activities of the components of the computer system (100).

The tangible storage (140) may be removable or non-removable, and includes magnetic storage media such as magnetic disks, magnetic tapes or cassettes, optical storage media such as CD-ROMs or DVDs, or any other medium which can be used to store information and which can be accessed within the computer system (100). The storage (140) stores instructions for the software (180) implementing one or more innovations for hardware-accelerated decoding of video bitstreams.

The input device(s) (150) may be a touch input device such as a keyboard, mouse, pen, or trackball, a voice input device, a scanning device, or another device that provides input to the computer system (100). For video, the input device(s) (150) may be a camera, video card, screen capture module, TV tuner card, or similar device that accepts video input in analog or digital form, or a CD-ROM or CD-RW that reads video input into the computer system (100). The output device(s) (160) may be a display, printer, speaker, CD-writer, or another device that provides output from the computer system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computer system (100), computer-readable media include memory (120, 125), storage (140), and combinations thereof. As used herein, the term computer-readable media does not include transitory signals or propagating carrier waves.

The innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or computer device. In general, a computer system or computer device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC such as an ASIC digital signal processor ("DSP"), a graphics processing unit ("GPU"), or a programmable logic device ("PLD") such as a field programmable gate array ("FPGA")) specially designed or configured to implement any of the disclosed methods.

For the sake of presentation, the detailed description uses terms like "determine" and "evaluate" to describe computer operations in a computer system. These terms are high-level abstractions for operations performed by a computer, and should not be confused with acts performed by a human being. The actual computer operations corresponding to these terms vary depending on implementation.

II. Architecture for Hardware-Accelerated Decoding

FIG. 2 shows a simplified architecture (200) for hardware-accelerated decoding. The architecture includes a host decoder (210), an accelerator interface (220), a device driver (230) for an accelerator, and accelerator hardware (240) for the accelerator. The device driver (230) and accelerator hardware (240) collectively provide functionality for the accelerator. The accelerator hardware (240) can be, for example, one or more GPUs or special-purpose decoding hardware.

The host decoder (210) receives at least part of a bitstream (201) of encoded data for video and manages at least some video decoding operations of the accelerator. For example, the host decoder (210) controls overall decoding and can also perform some decoding operations using a host CPU. The host decoder (210) signals control data (e.g., picture parameters for an uncompressed frame header for a given frame, a compressed frame header for the frame) and other data (e.g., compressed frame data) for the frame to the device driver (230) for the accelerator hardware (240) across an acceleration interface (220). Typically, the host decoder is implemented as user-mode software.

To the host decoder (210), the acceleration interface (220) provides a consistent interface to accelerator, regardless of the provider of the accelerator. Conversely, to an accelerator, the acceleration interface (220) provides a consistent interface to a host decoder, regardless of the provider of the host decoder. In general, the acceleration interface (220) transfers data for video and instructions for decoding between the host decoder (210) and the accelerator. The details of the acceleration interface (220) depend on implementation. For example, the acceleration interface (220) is exposed to the host decoder (210) as an application programming interface ("API"), and the device driver (230) associated with the accelerator is exposed through a device driver interface ("DDI"). In an example interaction, the host decoder (210) fills a buffer with instructions and/or data then calls a method of the interface (220) to alert the device driver (230) through the operating system. The buffered instructions and/or data, opaque to the operating system, are passed to the device driver (230) by reference, and data is transferred to memory of the accelerator hardware (240) if appropriate. While a particular implementation of the API and DDI may be tailored to a particular operating system or platform, in some cases, the API and/or DDI can be implemented for multiple different operating systems or platforms.

In order to impose consistency in the organization and timing of the data passed between the host decoder (210) and accelerator, an interface specification for the acceleration interface (220) can define a protocol for instructions and data for decoding according to a particular video codec standard or format. The host decoder (210) follows specified conventions when putting instructions and data in buffers. The device driver (230) retrieves the buffered instructions and data according to the specified conventions and (with the accelerator hardware (240)) performs decoding appropriate to the codec standard or format. Thus, an interface specification for a specific codec standard/format is adapted to the particular bit stream syntax and semantics of the standard/format. For example, in an implementation for hardware-accelerated decoding according to the VP8 format, the acceleration interface (220) defines a protocol for exchange of instructions and data (e.g., picture parameters and compressed video data) consistent with the specification entitled "VP8 Data Format and Decoding Guide," which is also known as IETF RFC 6386. Or, as another example, in an implementation for hardware-accelerated decoding according to the VP9 format, the acceleration interface (220) defines a protocol for exchange of instructions and data (e.g., picture parameters for an uncompressed frame header, a compressed frame header, and compressed video data) consistent with reference software for the VP9 format. In example implementations, for hardware-accelerated decoding according to the VP8 format or VP9 format, the interface specification uses basic call patterns, data flow, data structures, etc. similar to those specified in the DirectX Video Acceleration ("DXVA") Specification for H.264/AVC Decoding and other DXVA specifications, with variations or extensions as appropriate to handle differences for the VP8 format or VP9 format. Examples of such variations and extensions are detailed below. In alternative implementations, the accelerator interface (220) implements or extends an interface specification for hardware-accelerated decoding according to another standard or format.

The accelerator, through the device driver (230) and accelerator hardware (240), receives data for video and performs video decoding operations using the data, as managed by the host decoder (210). The division of decoding operations between the host decoder (210) and the accelerator depends on implementation, and it can vary for different acceleration profiles. In one acceleration profile, for example, the host decoder (210) performs basic bitstream parsing tasks, selectively enables/disables certain decoding operations (such as deblock filtering), manages buffering and updates of reference frames, and manages output of frames for display. The remaining decoding functions such as off-host parsing and entropy decoding to retrieve syntax elements for blocks (such as quantized transform coefficients, motion vector data, etc.), inverse frequency transforms, inverse quantization/scaling, motion compensation, intra prediction, loop filtering and post-processing are offloaded to the accelerator. The accelerator tracks sequential dependencies between the commanded decoding operations—such that read operations from a frame buffer used in prediction processes are not performed until the write operations to fill the frame buffer with the correct decoded data have been completed. Alternatively, for a different acceleration profile, the host decoder (210) performs certain additional decoding tasks instead of the accelerator, or the accelerator performs certain additional tasks otherwise performed by the host decoder (210).

III. Example Interface Specification

This section describes an example specification for an acceleration interface. The acceleration interface supports hardware-accelerated decoding of video encoded according to the VP8 format or VP9 format. The acceleration interface operates within the Microsoft Windows DirectX Video Acceleration ("DXVA") application programming interface ("API")/device driver interface ("DDI") context. In particular, this section describes high-level design concepts and specific VP8 and VP9 extensions, as well as data structures for transferring data for hardware-accelerated VP8 decoding or VP9 decoding. The example specification supports VP8 decoding and profile 0 of VP9 decoding. In terms of hardware acceleration profiles, the example specification supports off-host entropy coding profiles in which the accelerator performs most video decoding operations. Alternatively, another hardware acceleration profile is supported (e.g., a profile in which the host decoder performs more decoding operations and the accelerator performs fewer decoding operations).

In general, an acceleration interface includes a DDI for one or more display drivers and an API for a host decoder. Some decoding operations are implemented by a graphics hardware driver and GPU (or special-purpose decoding hardware). This set of functionality is an example of accelerator. Other decoding operations, such as frame surface allocation, retirement, reuse, and release, are implemented by user-mode application software, which is an example of host decoder (or software decoder). Processing performed by the accelerator is sometimes referred to as off-host processing. Typically, the accelerator uses the GPU (or special-purpose decoding hardware) to speed up some operations. When the accelerator performs decoding operations, the host decoder sends buffers of parameters and data to the accelerator, transferring the data that is used to perform the decoding operations.

In general, operations in the accelerator are stateless. The accelerator does not rely on assumptions about the sequences of decoding operations or internal-memory state dependencies. This facilitates "trick play" functionality and loss/error resilience functionality.

For additional details about VP8 decoding, see RFC 6386 (the VP8 Data Format and Decoding Guide) and reference software for VP8 decoding. For additional details about VP9 decoding, see the IETF specification entitled "VP9 Bitstream Overview," and the reference software for VP9 decoding.

A. Example Picture Parameter Data

The host decoder conveys data for a frame to an accelerator in order for the accelerator to decode the frame independently (e.g., without serial dependencies, or with minimized serial dependencies). In this section, flags and other syntax elements typically have the same names or similar names, compared to VP8 reference software and VP9 reference software. Both VP8 and VP9 lack support for field coding and field display; only progressive coding and display are supported. As used herein, the term "picture" indicates a frame.

1. Example Picture Entry Data Structure

FIG. 3 shows an example data structure (300) (DXVA_PicEntry_VPx) that contains information about an entry for a reference frame in reference frame buffer area. In particular, the data structure (300) specifies a reference to an uncompressed surface. The data structure (300) is based on data structures in previous variations of DXVA.

The data structure (300) is used in other data structures described herein. In the data structure (300), the value Index7Bits is an index that identifies an uncompressed surface for the CurrPic member or members of the ref_frame_map[ ] and frame_refs[ ] structures of the picture parameters structure (400) for a VP9-encoded frame. For a VP8-encoded frame, the value Index7Bits is an index that identifies an uncompressed surface for the CurrPic member or alt_fb_idx, gld_fb_idx, and lst_fb_idx members of the picture parameters structure (600). When Index7Bits is used in those members of a picture parameters structure (400, 600), the value directly specifies the index of an uncompressed surface. When Index7Bits does not contain a valid index, the value is 127.

In the data structure (300), the value AssociatedFlag is 0 when Index7Bits is valid. When Index7Bits is invalid, the value AssociatedFlag is 1. The value bPicEntry accesses the entire 8 bits of the union.

2. Example VP9 Picture Parameter Data

For a VP9-encoded frame, basic coding parameters include version, width, and height. Frame buffering state data and reference list-related data include CurrPic (indicating the current destination surface), frame_type, ref_frame_map[ ], frame _refs[ ], and ref_frame_sign_bias[ ]. Flags, and associated data controlling particular coding features that are the same for a whole frame, include error_resilient_mode_, intra_only, reset_frame_context, allow_high_precision_mv, interp_filter, refresh_frame _context, frame_parallel_decoding_mode, and frame_context_idx. Syntax values for deblocking, quantization, and tile partitions include filter_level, sharpness_level, mode_ref_delta_enabled, ref_deltas[ ], mode_deltas[ ], base_qindex, y_dc_delta_q, uv_dc_delta_q, uv_ac_delta_q, log2_tile_cols, and log2_tile_rows. Syntax values for a segmentation map include enabled, tree_probs[ ], red_probs[ ], abs_delta, feature_mask[ ], and feature_data[ ][ ].

FIG. 4 shows an example data structure (400) (DXVA_PicParams_VP 9) that includes data such as frame-level parameters and other settings for a compressed, current frame of a VP9 bitstream. For the most part, the settings are simply syntax elements from an uncompressed frame header of the current frame in the VP9 bitstream, with a 1:1 correspondence between syntax element and member of the data structure (400). The host decoder reads the value of such a syntax element from the uncompressed frame header then packs the appropriate value in the example data structure (400). The host decoder iteratively repeats the parsing/packing process, following the conditional logic and rules for VP9 bitstream construction. For some settings (such as surface index values), the host decoder assigns values based on syntax elements in the bitstream and decoding rules, but does not simply parse/pack values. Also, for some settings, the host decoder can override values of syntax elements in the bitstream in order to support trick mode processing, error concealment, or other decoding operations that deviate from normal decoding operations.

In the VP9 picture parameters data structure (400), the value CurrPic specifies the destination frame buffer/surface index for the decoded current frame. In this context, the value AssociatedFlag of the picture entry data structure (300) has no meaning and is 0, and the accelerator ignores its value.

The value version indicates the profile of the VP9 bitstream. (In some example implementations, the value is labeled "profile" instead of "version.") The VP9 format defines four profiles: profile 0, profile 1, profile 2, and profile 3. Profile 0 supports 4:2:0 chroma subsampling. Profile 1 adds support for 4:2:2 chroma subsampling, 4:4:4 chroma subsampling, alpha channel, and depth channel. Profile 2 allows for a bit depth of 10 bits to 12 bits per sample (rather than only 8 bits per sample for profiles 0 and 1) and supports 4:2:0 chroma subsampling. To these higher bit depths per sample, profile 3 adds support for 4:2:2 chroma subsampling, 4:4:4 chroma subsampling, and alpha channel.

The values width and height specify the coded width and coded height of the current frame. Aside from affecting the display process, these values can affect the decoding process, since each frame in a VP9 bitstream can potentially be encoded at a different spatial resolution than the previous frame(s).

The value frame_type specifies the frame type of the current frame. The allowed values are 0 and 1, for two types of VP9 frames, KEY_FRAME and INTER_FRAME.

The value error resilient mode affects whether the decoder performs operations in error resilient mode. When error resilient mode is on, decoding can continue with errors even when arbitrary frames are lost. In particular, the following restrictions are imposed in error resilient mode. First, entropy coding context probabilities are reset to defaults at the beginning of each frame, which effectively prevents propagation of forward updates as well as backward updates. Second, for motion vector ("MV") reference selection, the co-located MV from a previously encoded reference frame can no longer be included in the reference candidate list. Third, for MV reference selection, sorting of the initial list of MV reference candidates based on search in the reference frame buffer is disabled. These restrictions (with error_resilient_mode flag on) produce a modest performance drop in terms of rate-distortion performance but make decoding more resilient to data loss.

The value show_frame indicates whether the current frame is to be output and displayed after decoding completes.

The values refresh_frame_context and frame_parallel_decoding_mode indicate whether frame context is to be refreshed or not, when error_resilient_mode flag is equal to 0, as shown in the following table.

| refresh_frame_context | frame_parallel_decoding_mode | action done |
|---|---|---|
| 1 | 0 | refresh the context at the end |
| 0 | 0 | do not refresh |
| 0 | 1 | do not refresh |
| 1 | 1 | do not refresh |

When error_resilient_mode flag is equal to 1, refresh_frame_context is equal to 0 and frame_parallel_decoding_mode is equal to 1.

The values intra_only, frame_context_idx, and reset_frame_context affect handling of frame context. If the value of frame_type is 0 (KEY_FRAME) or the value of error_resilient_mode is 1, all frame contexts are reset. When the value of intra_only is 1, frame contexts are set as specified by reset_frame_context as follows. If the value of reset_frame_context is 0 or 1, the accelerator does not reset any contexts. If the value of reset_frame_context is 2, the accelerator resets the context specified in the frame header according to the value of frame_context_idx. If the value of reset_frame_context is equal to 3, the accelerator resets all frame contexts.

The value allow_high_precision_mv affects decoding operations for MV interpretation and motion compensation, as in the VP9 reference software. When the value of frame_type is 0 (KEY_FRAME), the value of allow_high_precision_mv is 0.

The value interp_filter affects decoding operations for sub-pixel interpolation in motion compensation, as in the VP9 reference software. In general, the interpolation filter in VP9 is ⅛-pixel accurate. Additionally, VP9 permits different blocks to pick one of multiple available interpolation filters. For example, the multiple available interpolation filters include the normal ⅛-pixel accurate filter, a smooth ⅛-pixel accurate filter (which lightly smoothes or blurs the prediction), and a sharp ⅛-pixel accurate filter (which lightly sharpens the prediction). Alternatively, the multiple available interpolation filters include other and/or additional filters (e.g., four filters instead of three filters).

The structure ref_frame_map[ ] contains a list of uncompressed frame buffer surfaces. Entries that will not be used for decoding the current frame, or any subsequent frames, are indicated by setting bPicEntry to 0xFF. (The value of Index7Bits is 127, and the value of AssociatedFlag is 1, indicating an invalid entry.) If bPicEntry is not 0xFF (e.g., the value of Index7Bits is less than 127, and the value of AssociatedFlag is 0), the entry may be used as a reference surface for decoding the current frame or a subsequent frame in decoding order. Uncompressed surfaces that correspond to frames that may be used for reference in the decoding process of the current frame or any subsequent frame are present in the ref_frame_map[ ] array, regardless of whether the frames are actually used in the decoding process of the current frame. No particular order is specified for the ordering of the entries in the ref_frame_map[ ] array. The host decoder can set values of the ref_frame_map[ ] array based on value of the refresh_frame_flags in a VP9 bitstream. During decoding, the accelerator uses the content of the ref_frame_map[ ] structure as provided by the host decoder, rather than determining how to update reference frame buffers based on syntax elements in the bitstream. This facilitates stateless operation according to which decoded frame buffer handling is performed under the control of the host decoder, rather than being determined from the bitstream by the accelerator.

The structure frame_refs[ ] indicates the reference surfaces to be used for inter prediction (sometimes called last, golden and altref reference frames) during the decoding of the current frame. The reference surface indices included in the frame_refs[ ] structure exist in the ref_frame_map[ ] structure. The accelerator maintains a pool of up to eight reference frames (as indicated in the ref_frame_map[ ] structure). The current frame uses up to three of the reference frames (as indicated in the frame_refs[ ] structure) from the pool for inter prediction of the current frame. After decoding finishes for the current frame, the accelerator can insert the reconstructed current frame into any, all, or none of the eight slots in the pool (as indicated in the ref_frame_map[ ] structure), evicting whatever frame(s) were there before. During decoding, the accelerator uses the content of the frame_refs[ ] structure as provided by the host decoder, rather than determine the information from syntax elements in the bitstream.

For VP9 decoding, the current frame can be coded using a different spatial resolution than the previous frame. In order to generate inter-picture prediction values during motion compensation, the accelerator can scale up or scale down a reference frame to match the spatial resolution of the current frame. The scaling can use 8-tap filters with 1/16-pixel accuracy.

The values in the ref_frame_sign_bias[ ] array affect decoding operations regarding reference mode and selection, as in the VP9 reference software. For example, the values in the ref_frame_sign_bias[ ] array affect MV candidate list, the setup of compound reference mode and compound motion compensation.

The values filter_level and sharpness_level affect decoding operations for deblock filtering, as in the VP9 reference software. The values mode_ref_delta_enabled, mode_ref_delta_update, ref_deltas[ ], and mode_deltas[ ] also affect decoding operations for deblock filtering, as in the VP9 reference software. These values indicate loop filter deltas applied at the block level based on mode or reference frame.

The values base_qindex, y_dc_delta_q, uv_dc_delta_q, and uv_ac_delta_q indicate quantization parameters applied for Y, U and V planes. They affect decoding operations for inverse quantization, as in the VP9 reference software.

FIG. 5 shows an example data structure (500) (segmentation_VP9) that is part of the VP9 picture parameters data structure (400). This segmentation data structure (500) provides segmentation-related syntax values and arrays when segmentation is enabled. The value enabled (in the segmentation data structure (500)) indicates whether segmentation-related syntax elements are present or not for current frame. If the value of enabled is 0, segmentation-related syntax elements are not present for the current frame, and the values of abs_delta and segmentation-related tables tree_probs[ ], pred_probs[ ], feature_data[ ][ ], and feature_mask[ ] are not valid (so they are ignored by the accelerator). The values update_map and temporal_update indicate whether or not tree_probs[ ] and pred_probs[ ], respectively, are updated by syntax elements in the current frame. The arrays tree_probs[ ] and pred_probs[ ] provide segmentation map data for the current frame. The elements abs_delta, feature_data[ ][ ], and feature_mask[ ] indicate other segmentation parameters for the current frame.

Returning to the VP9 picture parameters data structure (400) shown in FIG. 4, the values log2_tile_cols and log2_tile_rows affect tile partitioning and decoding operations involving tiles, as in the VP9 reference software. VP9 supports tile partitioning, in which a frame is broken up into a grid of tiles along superblock boundaries. Superblocks have the size of 64×64. Tiles are as evenly spaced as possible, and there are a power-of-two number of tiles. Tiles are at least 256 pixels wide and no more than 4096 pixels wide. There are no more than four tile rows. Tiles are scanned in raster scan order, and super blocks within tiles are coded in raster scan order. Thus, the ordering of superblocks within a frame depends on the tile structure. Coding dependencies are broken along vertical tile boundaries, which means that two tiles in the same tile row may be decoded at the same time. Coding dependencies are not broken between horizontal boundaries, however. At the start of every tile except the last one, a 32-bit byte count is transmitted, indicating how many bytes are used to code the next tile. For a decoder with parallel computing capability, this helps the decoder skip ahead to the next tile in order to start a parallel decoding task.

The value uncompressed_header_size_byte_aligned indicates the size of the uncompressed frame header for the current frame in bytes, with byte alignment. Using the value of uncompressed_header_size_byte_aligned, the accelerator may choose to skip the parsing of the uncompressed frame header (in a bitstream data buffer) for the current frame and start parsing of the compressed frame header and compressed video data for the current frame.

The value first_partition_size indicates the size of compressed frame header for the current frame in bytes. The accelerator can identify the beginning of compressed frame data (in a bitstream data buffer) by using the sum of uncompressed_header_size_byte_aligned and first_partition_size, which indicate uncompressed frame header size and compressed frame header size in bytes.

The values ReservedBits1 are ReservedBits2 are reserved for future use. For now, they are set to 0 by the host decoder, and the accelerator ignores their value. Alternatively, the values ReservedBits1 are ReservedBits2 can be assigned values understood by the host decoder and accelerator (e.g., private data, custom data, user data) outside the acceleration interface specification.

The value StatusReportFeedbackNumber is an arbitrary number set by the host decoder to use as a tag in status report feedback data. The value is not 0, and should be different in each call to Execute (described below).

In FIGS. 4 and 5, the sizes of values, arrays and other structures are not bit optimized. Alternatively, a host decoder and accelerator use structures in which the sizes of values, arrays and other structures are optimized to reduce the overall size of the structures.

3. Example VP8 Picture Parameter Data

For a VP8-encoded frame, basic coding parameters include version, width, and height. Frame buffering state data and reference list-related data include CurrPic (indicating the current destination surface), frame_type, alt_fb_idx, gld_fb_idx, 1st_fb_idx, ref_frame_sign_bias_golden, and ref_frame_sign_bias_altref. Flags, and associated data controlling particular coding features that are the same for a whole frame, include clamp_type, refresh_entropy_probs, vp8_coef_update_probs[ ][ ][ ][ ], mb_no_coeff_skip, prob_skip_false, prob_intra, prob_last, prob_golden, intra_16×16_prob[ ], intra_chroma_prob[ ], and vp8_mv_update_probs[ ][ ]. Syntax values for deblocking, quantization and bitstream partitions include filter_type, filter_level, sharpness_level, mode_ref_delta_enabled, mode_ref_lf_delta_update, ref_lf_deltas [ ], mode_lf_deltas[ ], base_qindex, y1dc_delta_q, y2dc_delta_q, y2ac_delta_q, uvdc_delta_q, uvac_delta_q, and log2_nbr_of_dct_partitions. Syntax values for a segmentation map include update_mb_segmentation_map, update_mb_segmentation_data, mb_segement_abs_delta, segment_feature_data [ ][ ], and mb_segment_tree_probs [ ].

FIGS. 6a and 6b show an example data structure (600) (DXVA_PicParams_VP8) that includes data such as frame-level parameters and other settings for a compressed, current frame of a VP8 bitstream. For the most part, the settings are simply syntax elements from a frame header of the current frame in the VP8 bitstream, with a 1:1 correspondence between syntax element and member of the data structure (600). The host decoder reads the value of such a syntax element from the frame header then packs the appropriate value in the example data structure (600). The host decoder iteratively repeats the parsing/packing process, following the conditional logic and rules for VP8 bitstream construction. For some settings (such as surface index values), the host decoder assigns values based on syntax elements in the bitstream and decoding rules, but does not simply parse/pack values. Also, for some settings, the host decoder can override values of syntax elements in the bitstream in order to support trick mode processing, error concealment, or other decoding operations that deviate from normal decoding operations.

In the VP8 picture parameters data structure (600), the value CurrPic specifies the destination frame buffer/surface index for the decoded current frame. In this context, the value AssociatedFlag of the picture entry data structure (300) has no meaning and is 0, and the accelerator ignores its value.

The value frame_type specifies the frame type of the current frame. The allowed values are 0 and 1, for two types of VP8 frames, KEY_FRAME and INTER_FRAME.

The value version enables or disables certain features in the VP8 bitstream, as specified in RFC 6386.

The value show_frame indicates whether the current frame is to be output and displayed after decoding completes.

The value first_part_size indicates the size of the first partition (control partition) for the current frame in the VP8 bitstream. The accelerator can choose to skip the parsing of the first partition (control partition) and start decoding macroblock data.

The values width and height specify the coded width and coded height of the current frame. Aside from affecting the display process, these values can affect the decoding process, since spatial resolution can change at key frame in a VP8 bitstream. Optional upscaling of decoding frames prior to display is done outside the context of the accelerator, when the value of horiz_scale is non-zero and/or the value of vert_scale is non-zero.

The value clamp_type indicates if the decoder is required to clamp reconstructed pixel values, as specified in RFC 6386. Allowed values are RECON_CLAMP_REQUIRED (0) and RECON_CLAMP_NOTREQUIRED (1).

The value segmentation_enabled enables the segmentation feature for the current frame. When the value of segmentation_enabled is 0, the accelerator ignore the values in the stVP8Segments structure. In VP8 coding and decoding, segments are used to change quantizer level and loop filter level for a macroblock. When the segment-based adjustments are enabled for a current frame, each macroblock within the current frame is coded with a segment_id. This effectively segments the macroblocks of the current frame into a number of different segments. Macroblocks within the same segment have the same quantizer and loop filter level adjustments.

FIG. 7 shows an example data structure (700) (segmentation_VP8) that is part of the VP8 picture parameters data structure (600). The segmentation data structure (700) provides segmentation-related syntax values and arrays when segmentation is enabled. The update_mb_segmentation_map indicates whether a macroblock segmentation map is updated in the current frame. The value update_segment_feature_data indicates if segment feature data is updated in the current frame. The value mb_segment_abs_delta indicates a feature data update mode: 0 for delta, or 1 for absolute value. The array segment_feature_data[ ][ ] indicates alternate quantizer and alternate loop filter values for segments. Finally, the array mb_segment_tree_probs [ ] indicates branch probabilities of the segment_id decoding tree.

Returning to the VP8 picture parameters data structure (600) shown in FIGS. 6a and 6b, the values filter_type, filter_level, and sharpness_level affect decoding operations for deblock filtering, as specified in RFC 6386. The value of filter_type determines whether a normal loop filter or simple loop filter is used. The values of filter_level and sharpness_level control the deblock filtering. The mode_ref_lf_delta_enabled and mode_ref_lf_delta_update also affect decoding operations for deblock filtering, as specified in RFC 6386. They indicate if macroblock-level loop filter adjustments (based on the reference frame used and coding mode) are on for the current frame, and if delta values used in adjustment are updated in the current frame. The values in ref_lf_deltas[ ] specify the adjustment delta values corresponding to used reference frames for loop filtering. The values in mode_lf_deltas[ ] specify adjustment delta values for certain macroblock prediction modes for loop filtering.

The value log2_nbr_of_dct_partitions indicates the number of separate partitions containing the DCT coefficients of the macroblocks of the current frame, as specified in RFC 6386.

The value base_qindex indicates a dequantization table index used for luma AC coefficients (and other coefficient groups if no delta quantization parameter values are present), as specified in RFC 6386. The values y1dc_delta_q, y2dc_delta_q, y2ac_delta_q, uvdc_delta_q, and uvac_delta_q indicate quantization parameters applied for Y, Y2, U and V planes, for DC coefficients and AC coeffients. They affect decoding operations for inverse quantization, as specified in RFC 6386.

The values alt_fb_idx, gld_fb_idx, and 1st_fb_idx specify the frame buffer/surface index values for three reference frames available for the current frame: the altref frame, the golden frame, and the previous reconstructed frame (last frame). In this context, the AssociatedFlag (of the picture entry structure (300) for a frame buffer indicator) has no meaning and is 0, and the accelerator ignores its value. The host decoder can set the values of alt_fb_idx, gld_fb_idx, and1st_fb_idx in the VP8 picture parameters data structure (600) based on the values of syntax elements copy_buffer_to_arf, copy_buffer_to _gf, refresh_golden_frame, refresh_alt_ref_frame, and refresh_last_frame in the VP8 bitstream. Or, the host decoder can set the values of alt_fb_idx, gld_fb_idx, and 1st_fb_idx to be inconsistent with the indications of those syntax elements in the VP8 bitstream. In this case, the accelerator honors the host decoder's settings of alt_fb_idx, gld_fb_idx, and 1st_fb_idx.

The accelerator maintains four YUV frame buffers/surfaces for decoding purposes. These frame buffers hold the current frame being reconstructed, the previous reconstructed frame, the most recent golden frame, and the most recent altref frame.

The values ref_frame_sign_bias_golden and ref_frame_sign_bias_altref control the sign of MVs when the golden frame is referenced and when the alternate frame is referenced, respectively, as specified in RFC 6386.

The value refresh_entropy_probs indicates whether updated token probabilities are used only for the current frame or until further update. The vp8_coef_update_probs[ ][ ][ ][ ] array indicates new branch probabilities for different block types, coefficient bands, coefficient contexts, and entropy coding nodes. The forward probability updates are cumulative. That is, a probability updated on one frame is in effect for all ensuing frames until the next key frame, or until the probability is explicitly updated by another frame. Other values and arrays (including prob_skip_false, prob_intra, prob_last, prob_golden, intra_16x16_prob[ ], intra_chroma_prob[ ], and vp8_mv_update_probs[ ][ ]) indicate probability values used in entropy decoding, as specified in RFC 6386. The value mb_no_coeff_skip enables or disables the skipping of macroblocks containing no non-zero coefficients, as specified in RFC 6386.

The values ReservedBits1 are ReservedBits2 are reserved for future use. For now, they are set to 0 by the host decoder, and accelerators ignore their value. Alternatively, the values ReservedBits1 are ReservedBits2 can be assigned values understood by the host decoder and accelerator (e.g., private data, custom data, user data) outside the acceleration interface specification.

The value StatusReportFeedbackNumber is an arbitrary number set by the host decoder to use as a tag in status report feedback data. The value is not 0, and should be different in each call to Execute (described below).

4. Example Slice Control Data Structure

FIG. 8 shows an example data structure (800) (DXVA_Slice_VPx_Short) that conveys slice control data from the host decoder to the accelerator. In VP9, a frame has a single slice. (VP9 does not support multiple slices per frame.) If the value of wBadSliceChopping is 0 or 1, the value of BSNALunitDataLocation indicates the location of the compressed bitstream data for the current frame. The value is a byte offset, from the start of the bitstream data buffer, to the first byte of the compressed frame data. If the value of wBadSliceChopping is not 0 or 1, the value of BSNALunitDataLocation is 0. The value of SliceBytesInBuffer indicates a number of bytes in the bitstream data buffer that are associated with the slice control data structure, starting with the byte at the offset given in BSNALunitDataLocation. The different values of wBadSliceChopping are shown in the following table.

| Value | Description |
| --- | --- |
| 0 | All bits for the slice are located within the corresponding bitstream data buffer. |
| 1 | The bitstream data buffer contains the start of the slice, but not the entire slice, because the bitstream data buffer is full. |
| 2 | The bitstream data buffer contains the end of the slice. It does not contain the start of the slice, because the start of the slice was located in the previous bitstream data buffer. |
| 3 | The bitstream data buffer does not contain the start of the slice (because the start of the slice was located in a previous bitstream data buffer), and it does not contain the end of the slice (because the current bitstream data buffer is also full). |

Generally, the host decoder avoids using values other than 0 for wBadSliceChopping. The size of the data in the bitstream data buffer (and the amount of data reported by the host decoder) is an integer multiple of 128 bytes. When wBadSliceChopping is 0 or 2, if the end of the slice data is not an even multiple of 128 bytes, the decoder pads the end of the buffer with zeroes. The host decoder typically sends only decodable compressed frames to the accelerator, but the accelerator may be configured to handle non-decodable frames.

B. Example Data Buffers

The host decoder transfers instructions and data to the accelerator through buffers. For a frame, the buffers include, for example, a picture parameter data buffer, a slice control buffer, and one or more bitstream data buffers. The picture parameter data buffer stores picture parameter data (e.g., VP9 picture parameter data in the structure (400) of FIG. 4 or VP8 picture parameter data in the structure (600) of FIGS. 6a and 6b). The slice control buffer stores slice control data (e.g., in the structure (800) shown in FIG. 8). VP8 and VP9 do not have support for multiple slices per frame. Hence, there is always one slice control buffer per compressed frame. The bitstream data buffer(s) accompany the slice control buffer (e.g., as one continuous buffer). For VP8 decoding, a bitstream data buffer stores compressed frame data for a current frame of a VP8 bitstream. For VP9 decoding, a bitstream data buffer stores a compressed frame header and compressed frame data for a current frame of a VP9 bitstream. The total quantity of data in a bitstream buffer (and the amount of data reported by the host decoder) is an integer multiple of 128 bytes.

C. Example Decoding Control

The example interface specification for hardware-accelerated decoding specifies the basic sequence of operations for hardware-accelerated decoding, including calls to BeginFrame, GetBuffer, ReleaseBuffer, Execute and EndFrame routines of the acceleration interface. The host decoder sends one compressed frame between each pair of BeginFrame/EndFrame calls, and it can call the Execute routine one or more times between the BeginFrame/EndFrame calls.

The host decoder calls the BeginFrame routine to signal the start of one or more decoding operations by the accelerator, which will cause the accelerator to write data into an uncompressed surface buffer specified in the call to the BeginFrame routine. Between a pair of BeginFrame/EndFrame calls, the host decoder can send one or more sets of buffers. The host decoder gets a buffer by calling the GetBuffer routine, and later can release the buffer by calling the ReleaseBuffer routine. The host decoder fills the buffer(s) with parameters and other control information, compressed frame data, etc. For example, the buffers include one picture parameters data buffer, one slice control data buffer, and one or more bitstream data buffers. The total quantity of data in any bitstream data buffer (and the amount of data reported by the host decoder) is an integer multiple of 128 bytes. The accelerator can treat any padding of zero bytes for 128-byte alignment as trailing zeros.

The host decoder calls the Execute routine one or more times to send the buffer(s) of data to the accelerator. The data passed with a call to the Execute routine includes a destination index to indicate which uncompressed surface buffer is affected by the operation. A buffer type can indicate the type of data in a buffer. For example, when the buffer type is DXVA2_PictureParametersBufferType (in DXVA 2.0), a VP8 picture parameters data structure (400) or VP9 picture parameters data structure (600) can be passed in a picture parameters data buffer. When the buffer type is DXVA2_SliceControlBufferType (DXVA 2.0), a slice control data structure (800) can be passed in a slice control data buffer. The operations to be performed by the accelerator can be specified as a parameter to the call or in a data structure passed to the accelerator.

The host decoder calls the EndFrame routine to signal that the host decoder has sent all of the data needed for a particular BeginFrame call, and the accelerator can then complete the specified operations.

During a BeginFrame/EndFrame sequence for a current picture, the accelerator will, in some cases, access uncompressed surfaces other than the surface to which the reconstructed current frame is being written. For example, decoding the current frame may require data from one or more previously-decoded, reference frames for use in inter-picture motion prediction. If the host decoder issues a command that writes to a buffer, and then issues a command that reads from the same buffer, the accelerator serializes the operations appropriately. In other words, the accelerator completes a preceding write operation on a buffer before starting a subsequent read operation on the same buffer.

The host decoder does not send buffers for status reporting feedback. Rather, the host decoder reads such buffers when requesting status reporting feedback. A parameter (bDXVA_Func) passed to the accelerator in a call to the Execute routine can indicate the host decoder is passing a compressed frame for decoding (bDXVA_Func is 1) or requesting a status report (bDXVA_Func is 7).

D. Example Status Reporting

After calling the EndFrame routine for an uncompressed destination surface (for the current frame), the host decoder may call Execute with bDXVA_Func=7 to get a status report. The host decoder does not pass any compressed buffer to the accelerator in this call. Instead, the host decoder provides a private output data buffer into which the accelerator will write status information, specifying a pointer to the output data buffer and maximum amount of data that can be written to the output data buffer.

Handling of status requests is asynchronous to decoding. The host decoder does not wait to receive status information in response to a request before the host decoder starts another operation. When the accelerator receives an Execute call for status reporting, the accelerator does not stall to wait for any prior operations to complete. Instead, the accelerator immediately provides available status information for all operations that have completed since the previous request for a status report, up to the maximum amount requested. Immediately after the Execute call returns, the host decoder can read the status report information from the buffer. After the host decoder has received the status report, the accelerator discards its status report information and does not report it again. (That is, the results of a particular operation by the accelerator are not reported to the host decoder more than once.)

FIG. 9 shows an example data structure (900) DXVA_Status_VPx for status report data, which is sent by the accelerator to the host decoder (in the output data buffer) to convey decoding status information. The value StatusReportFeedbackNumber includes the value of StatusReportFeedbackNumber set by the host decoder in the picture parameters data structure for the associated operation. The value CurrPic specifies an uncompressed destination surface that was affected by the operation. The value bBufType indicates the type of compressed buffer associated with this status report (e.g., all of the compressed buffers conveyed in the associated Execute call, only the picture parameters data buffer, only the slice control buffer, only the bitstream data buffer(s)). The value bStatus indicates the status of the operation (e.g., successful, minor problem in data format/host decoder should continue, significant problem in data format/host decoder may continue executing or skip display of the output picture, severe problem in data format/host decoder should restart the entire decoding process starting at a sequence or random-access entry point, or other severe problem/host decoder should restart the entire decoding process starting at a sequence or random-access entry point). If the operation was not successfully, the value wNumMbsAffected provides an estimate of the number of blocks of the frame that were adversely affected by a reported problem. Otherwise (operation successful), the value wNumMbsAffected can provide an estimate of the number of blocks of the frame that were successfully decoded.

The accelerator has internal capacity to store at least x DXVA_Status_VPx structures, where x depends on implementation (e.g., 512), while awaiting status requests from the host decoder. The accelerator may exceed this storage capacity, if appropriate. If the accelerator discards status report data, it can discard the oldest status report data first. The accelerator can provide status reports in reverse temporal order of when the operations were completed, with status reports for the most recently completed operations appearing earlier in the list of status report data structures.

E. Example Accelerator-internal Operations and Storage

For use in decoding, the accelerator can store various types of additional data, including reconstructed frames (for use as reference frames), data used to derive MVs, and data used to update entropy decoding contexts. Rather than have the host decoder collect such data, explicitly update it, and provide it to the accelerator, the accelerator stores the data as it decodes a frame.

For VP9 decoding, the accelerator stores an array of reference frames along with data used in inter-picture prediction, such as co-located MVs from a decoded reference frame used in a MV candidate list. The accelerator also accumulates counts for various symbols actually decoded over a frame, which are used for backward context updates on the completion of decoding of the frame. In VP9 decoding, coded spatial resolution can change on a frame-by-frame basis even for non-key frames. A given inter-picture coded frame can be coded at a different spatial resolution than the previous frame(s). When determining inter-frame prediction values, a reference frame is scaled up or down, as appropriate, by the accelerator using internal operations. The scaling filter used by the accelerator is an 8-tap filter with $\frac{1}{16}$-pixel accuracy.

For VP8 decoding, the accelerator typically uses up to three reference frames when decoding the current frame—either the previous frame, the so-called golden frame, or the so-called altref frame. Co-located MVs from a decoded reference frame are not used during decoding. Instead, only spatial neighbor MVs are used. VP8 coding/decoding use forward probability updates without backward context updates. The forward probability updates are accumulative. That is, a probability updated on one frame is in effect for all ensuing frames until the next key frame, or until the probability is explicitly updated by another frame. In VP8 decoding, coded spatial resolution can change at key frames. Inter-prediction from a reference frame at a different spatial does not happen, so the accelerator need not perform scaling on reference frames for motion prediction and compensation.

F. Example Configuration Parameters

In example implementations for VP8 decoding or VP9 decoding, a host decoder and accelerator use configuration parameters specified in earlier variations of DXVA. For example, configuration parameters are specified in a DXVA2_ConfigPictureDecode structure. Settings in the DXVA2_ConfigPictureDecode structure control features such as encryption protocol type for bitstream data buffers, other encryption parameters, and parameters indicating which coding/decoding tools are enabled or disabled in the accelerator.

IV. Transferring Data from Uncompressed Frame Header and Compressed Frame Header in Separate Buffers In some codec formats (such as VP9), part of the header for a frame is an "uncompressed frame header" and part is a "compressed frame header." For example, the serialized VP9 bitstream includes an uncompressed frame header (with picture parameters), a compressed frame header (with probability update information), and compressed frame data (mode data, MVs, quantized transform coefficients, etc.).

This section describes innovations that relate to transfer of data based at least in part on an uncompressed frame header in a separate buffer from a compressed frame header (and compressed video data). For example, settings based at least in part on an uncompressed frame header are transferred in a first buffer (such as a picture parameters data buffer), and a compressed frame header and compressed frame data are transferred in a second buffer (such as a bitstream data buffer). In many cases, the compressed frame header consumes a significant number of bits, compared to the settings based at least in part on the uncompressed frame header. At the same time, the uncompressed frame header includes values used to control many decoding operations. By separately processing and transferring the uncompressed and compressed portions of the frame header, the host decoder and accelerator can simplify parsing/decoding by the host decoder and limit the size of the first buffer, while effectively providing data that is useful to the accelerator for control of video decoding operations.

FIG. 10 illustrates the transfer of portions of an example video elementary bitstream (1000) in data buffers accessible to an accelerator. For a frame, the video elementary bitstream (1000) includes an uncompressed frame header (1010), a compressed frame header (1020), and compressed video data (1030). The data for the frame is transferred to a set of data buffers (1050) for an acceleration interface, including a picture parameters data buffer (1060) and one or more bitstream data buffers (1070 . . . 107n).

As shown in FIG. 10, a host decoder maps some syntax elements of the uncompressed frame header (1010) to members of a picture parameters data structure in the picture parameters data buffer (1060). For the most part, syntax elements from the uncompressed frame header (1010) of the frame are simply mapped to members of the data structure, with a 1:1 correspondence between syntax element and member of the data structure. The host decoder reads the value of a syntax element from the uncompressed frame header (1010) then writes the appropriate value in a corresponding location in the picture parameters data buffer (1060). For other syntax elements, the host decoder sets picture parameters in the buffer (1060) after interpreting syntax elements in the uncompressed frame header (1010) according to rules (e.g., rules for updating reference frame buffers). The accelerator uses the data in the picture parameters data buffer (1060) to control various aspects of decoding (e.g., reference frame management, loop filtering, inverse quantization, ordering according to tiles).

Despite the compressed frame header (1020) being header data for the frame, it is not passed as part of the picture parameters data buffer (1060). Instead, the host decoder copies the compressed frame header (1020) to one of the bitstream data buffer(s) (1070 . . . 107n). The host decoder also copies the compressed video data (1030) to the bitstream data buffer(s) (1070 . . . 107n). The accelerator uses the compressed frame header (1020) to control various aspects of decoding (e.g., updating entropy decoding contexts), and performs decoding operations on the compressed video data (1030). The host decoder can pass a redundant copy of the uncompressed frame header (1010) to the accelerator. For example, the host decoder copies the uncompressed frame header (1010) to the start of the first of the bitstream data buffer(s) (1070 . . . 107n).

FIG. 11 illustrates a generalized technique (1100) for transferring portions of an example video bitstream in data buffers accessible to an accelerator, from the perspective of a host decoder in communication with the accelerator across an acceleration interface. The host decoder receives (1110) at least part of a bitstream of encoded data for video and manages (1120) at least some video decoding operations of the accelerator across the acceleration interface.

In particular, the host decoder parses, from the at least part of the bitstream, an uncompressed frame header for a current frame of the video. The host decoder transfers, to the accelerator across the acceleration interface, data based at least in part on the uncompressed frame header in a first buffer (e.g., picture parameters data buffer). For example, the data based at least in part on the uncompressed frame header includes: (a) settings for decoding tools that apply for the current frame, (b) reference frame assignments for the current frame (e.g., surface index values that indicate the reference frame assignments), (c) settings for inverse quantization of quantized transform coefficients of the current frame, (d) settings for deblock filtering of block boundaries in the current frame, and/or (e) segmentation parameters for blocks of the current frame. Alternatively, the data based at least in part on the uncompressed frame header includes other and/or additional settings. In some cases, the host decoder simply maps syntax elements from the bitstream to locations in the first buffer. In other cases, the host decoder interprets syntax elements from the bitstream and determines appropriate values to write to locations in the first buffer. In the data transferred in the first buffer, at least some of the settings can override inconsistent values elsewhere in data for the current frame (e.g., for reference frame assignments, control of deblock filtering, or display).

The host decoder also transfers, to the accelerator across the acceleration interface, a compressed frame header for the current frame in a second buffer different than the first buffer (e.g., a bitstream data buffer instead of the picture parameters data buffer). For example, the compressed frame header includes entropy-coded data indicating probabilities of values of entropy-coded syntax elements for the current frame, where the probabilities can be signaled as differences relative to default values. Alternatively, the compressed frame header includes other and/or additional data.

As part of managing (1120) video decoding operations of the accelerator, the host decoder can also transfer, to the accelerator across the acceleration interface, compressed frame data for the current frame in the second buffer. The compressed frame data can include: (a) mode data for blocks of the current frame, (b) MV data for blocks of the current frame, (c) quantized transform coefficient data for blocks of the current frame, and/or (d) other data for blocks of the current frame. Alternatively, the compressed frame data includes other and/or additional types of data. If the second buffer is full, the compressed frame data can be transferred in one or more additional buffers. Further, the host decoder can transfer in the second buffer, to the accelerator across the acceleration interface, a copy of the uncompressed frame header. A variable in the data based at least in part on the uncompressed frame header can indicate the size of the uncompressed frame header, thereby helping the accelerator skip parsing of the uncompressed frame header in the second buffer, if the accelerator chooses to do so. The host decoder checks (1130) whether to continue with the next frame. If so, the host decoder receives (1110) at least part of the bitstream of encoded data for the next frame.

FIG. 12 illustrates a generalized technique (1200) for transferring portions of an example video bitstream in data buffers accessible to an accelerator, from the perspective of the accelerator, which is in communication with a host decoder across an acceleration interface. The accelerator receives (1210) in a first buffer, from the host decoder across the acceleration interface, data based at least in part on an uncompressed frame header for a current frame of video. For example, the first buffer is a picture parameters data buffer. The data based at least in part on the uncompressed frame header can include: (a) settings for decoding tools that apply for the current frame, (b) reference frame assignments for the current frame (e.g., surface index values that indicate the reference frame assignments), (c) settings for inverse quantization of quantized transform coefficients of the current frame, (d) settings for deblock filtering of block boundaries in the current frame, and/or (e) segmentation parameters for blocks of the current frame. Alternatively, the data based at least in part on the uncompressed frame header includes other and/or additional settings. In the data transferred in the first buffer, at least some of the settings can override inconsistent values elsewhere in data for the current frame (e.g., for reference frame assignments, control of deblock filtering, or display), in which case the accelerator complies with the settings in the data transferred in the first buffer.

The accelerator also receives (1220) in a second buffer, from the host decoder across the acceleration interface, a compressed frame header for the current frame. The second buffer is different than the first buffer. For example, the first buffer is a picture parameters data buffer, and the second buffer is a bitstream data buffer. The compressed frame header can include entropy-coded data indicating probabilities of values of entropy-coded syntax elements for the current frame. Alternatively, the compressed frame header includes other and/or additional data.

The accelerator can also receive in the second buffer, from the host decoder across the acceleration interface, compressed frame data for the current frame. The compressed frame data can include: (a) mode data for blocks of the current frame, (b) MV data for blocks of the current frame, (c) quantized transform coefficient data for blocks of the current frame, and/or (d) other data for blocks of the current frame. Alternatively, the compressed frame data includes other and/or additional types of data. If the second buffer is full, the compressed frame data can be transferred in one or more additional buffers. Further, the accelerator can receive in the second buffer, from the host decoder across the acceleration interface, a copy of the uncompressed frame header for the current frame. A variable in the data based at least in part on the uncompressed frame header can indicate size of the uncompressed frame header, thereby helping the accelerator skip parsing of the uncompressed frame header in the second buffer, if the accelerator chooses to do so.

The accelerator performs (1230) video decoding operations using the data based at least in part on the uncompressed frame header and the compressed frame header (and the compressed frame data). The accelerator checks (1240) whether to continue with the next frame. If so, the accelerator receives (1210, 1220) data for the next frame.

FIG. 13 illustrates an example technique (1300) for transferring portions of data for a current frame in data buffers accessible to an accelerator, from the perspective of a host decoder in communication with the accelerator across an acceleration interface. In the example technique (1300), the host decoder uses data buffers and call patterns of the example interface specification described in sections III.A-III.C.

To start, the host decoder calls (1310) the BeginFrame routine to initiate decoding for the current frame. The host decoder sets (1320) data based at least in part on an uncompressed frame header for the current frame in a picture parameters data buffer (e.g., calling the GetBuffer routine to get the picture parameters data buffer). The host decoder also sets (1330, 1340) the compressed frame header and compressed frame data for the current frame in one or more bitstream data buffers (e.g., calling the GetBuffer routine to get a bitstream data buffer). Then, the host decoder calls (1350) the Execute routine to transfer the data in the buffers to the accelerator. The host decoder calls (1360) the EndFrame routine to signal that it has transferred all data needed for a particular BeginFrame call, so that the accelerator can begin decoding the current frame.

FIG. 14 illustrates an example technique (1400) for transferring portions of data for a current frame in data buffers accessible to an accelerator, from the perspective of the accelerator, which is in communication with a host decoder across an acceleration interface. In the example technique (1400), the accelerator uses data buffers and reacts to call patterns of the example interface specification described in sections III.A-III.C.

To start, the accelerator receives (1410) a signal to initiate decoding for the current frame. The accelerator gets (1420) data based at least in part on an uncompressed frame header for the current frame in a picture parameters data buffer. The accelerator also gets (1430, 1440) a compressed frame header and compressed frame data for the current frame in one or more bitstream data buffers. Then, the accelerator receives (1450) another signal, which indicates the accelerator has received all data needed to decode the current frame, and begins to perform decoding operations for the current frame.

V. Host Decoder Overriding Settings from a Bitstream

This section describes innovations that relate to a host decoder overriding settings in a bitstream. In some cases, depending on the context of playback, the host decoder can use the settings to override redundant or unnecessary decoding operations by the accelerator (e.g., skipping deblock filtering when spatial resolution is low). In other cases, the host decoder can use the settings to provide functionality other than basic decoding (e.g., trick mode processing, error concealment). For example, the settings relate to management of reference frame buffers, deblock filtering controls, or decisions to show/not show a frame after decoding. In the accelerator, the host decoder's decisions (as reflected in the settings provided by the host decoder) control decoding operations, even when those decisions are inconsistent with other values in the bitstream that the accelerator receives.

Figure 15:
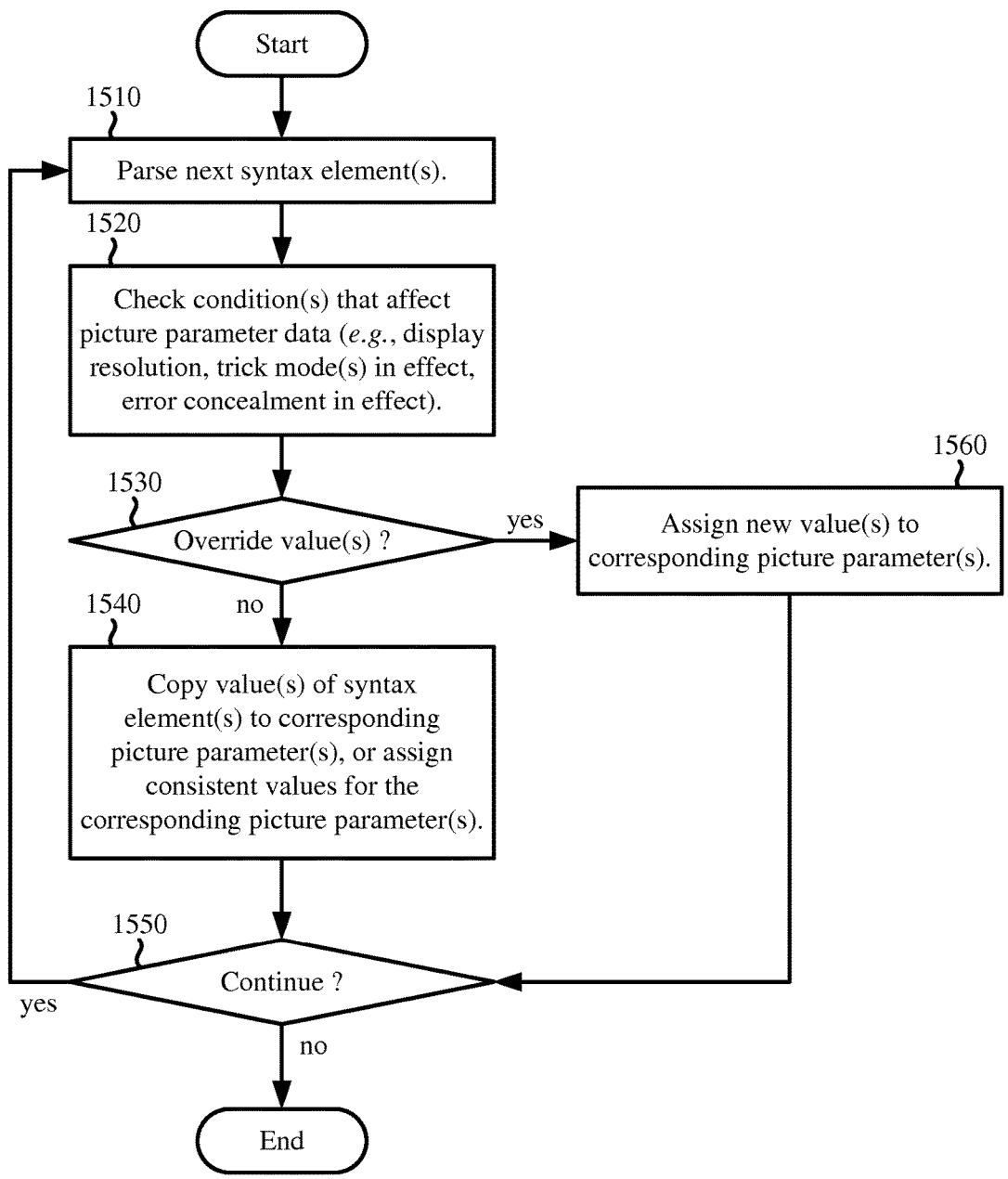
FIG. 15 is a flowchart illustrating an example technique for selectively overriding values of syntax elements of a bitstream, from the perspective of a host decoder.

FIG. 15 illustrates an example technique (1500) for selectively overriding values of syntax elements of a bitstream, from the perspective of a host decoder. In the example technique (1500), the host decoder uses picture parameter data structures and data buffers of the example interface specification described in sections III.A-III.B.

The host decoder parses (1510) the next syntax element(s) in a bitstream. For example, the bitstream is a VP8 bitstream or VP9 bitstream, and the host decoder parses syntax element(s) for a current frame from the bitstream. The host decoder checks (1520) one or more conditions that affect settings in picture parameter data and decides (1530) whether to override the value(s) of the syntax element(s) from the bitstream. If not, the host decoder copies (1540) the value(s) of the syntax element(s) from the bitstream to corresponding picture parameter(s) in a picture parameter data structure (such as a VP8 picture parameter data structure or VP9 picture parameter data structure) in a data buffer. Or, the host decoder assigns (1540) settings(s) for the corresponding picture parameter(s) that are consistent with the value(s) of the syntax element(s) from the bitstream. On the other hand, if the host decoder overrides the value(s) of the syntax element(s) from the bitstream, the host decoder assigns (1560) new values to the corresponding picture parameter(s) in the picture parameter data structure in the data buffer. The host decoder checks (1550) whether to continue and, if so, parses the next syntax element(s) in the bitstream. For its part, the accelerator complies with decisions set by the host decoder.

For example, the host decoder can check the spatial resolution of display for decoded video and selectively override values of certain syntax elements in the bitstream. When an application creates thumbnails or small previews of video, spatial resolution is small, and operations for deblock filtering are unnecessary. The computational cost of deblock filtering would be wasted, considering the size of rendered output. In this context, the host decoder can change deblock filtering settings in order to disable deblock filtering. In the VP9 picture parameters data structure (400) shown in FIG. 4, for example, the host decoder changes values of filter_level and sharpness_level to disable deblock filtering. The host decoder can also change values of mode_ref_delta_enabled, mode_ref_delta_update, ref_deltas[ ], and mode_deltas[ ]. In the VP8 picture parameters data structure (600) shown in FIGS. 6a and 6b, for example, the host decoder changes values of filter_type, filter_level, and sharpness_level to disable deblock filtering. The host decoder can also changes values of mode_ref_lf delta_enabled, mode_ref_lf_delta_update, ref_lf_deltas[ ], and mode_lf_deltas[ ]. These new settings by the host decoder may be inconsistent with deblock filtering control values otherwise set in the bitstream, but the values set by the host decoder control deblock filtering decisions made by the accelerator.

As another example, the host decoder can provide trick mode functionality (e.g., fast forward, slow forward, fast reverse, slow reverse). Or, the host decoder can provide error concealment functionality to hide loss of encoded data during playback. In these contexts, the host decoder can change flags that control whether a frame is shown or not shown after decoding. In this way, the host decoder can control how and when frames are displayed. In the VP9 picture parameters data structure (400) shown in FIG. 4 or VP8 picture parameters data structure (600) shown in FIGS. 6a and 6b, for example, the host decoder changes the value of show_frame. Or, the host decoder can change reference frame assignments, which affects which reference frames are used during decoding. In the VP9 picture parameters data structure (400) shown in FIG. 4, for example, the host decoder changes values in the frame_refs[ ] structure and/or the ref_frame_map[ ] structure. The host decoder can also change values in ref_frame_sign_bias[ ]. In the VP8 picture parameters data structure (600) shown in FIGS. 6a and 6b, for example, the host decoder changes the values of alt_fb_idx, gld_fb_idx, and/or 1st_fb_idx. The host decoder can also change values of ref_frame_sign_bias_golden and/or ref_frame_sign_bias_altref.

Figure 16:
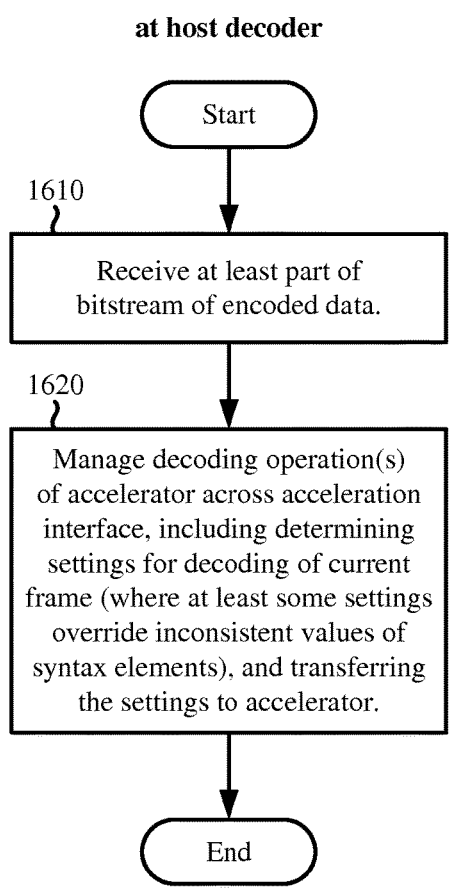
FIGS. 16 and 17 are flowcharts illustrating generalized techniques for using settings that override values of syntax elements of a bitstream, from the perspectives of a host decoder and accelerator, respectively.

FIG. 16 illustrates a generalized technique (1600) for using settings that override values of syntax elements of a bitstream, from the perspective of a host decoder in communication with an accelerator across an acceleration interface. The host decoder receives (1610) at least part of a bitstream of encoded data for video and manages (1620) at least some video decoding operations of the accelerator. In doing so, the host decoder determines settings for decoding of a current frame of the video and transfers, to the accelerator across the acceleration interface, the settings for the decoding of the current frame. For example, the settings are transferred as part of data based at least in part on an uncompressed frame header for a compressed frame of a VP9 bitstream. Or, as another example, the settings are transferred as part of data based at least in part on a compressed frame of a VP8 bitstream. At least some of the settings override inconsistent values of syntax elements in the at least part of the bitstream.

For example, the settings that override inconsistent values (of syntax elements from the bitstream) include settings to disable deblock filtering of block boundaries in the current frame. In this scenario, the host decoder can determine that display resolution is below a threshold level (which depends on implementation, e.g., 128×128, 200×200, 300×300) and, in response to the determination that the display resolution is below the threshold level, determine the settings to disable deblock filtering of block boundaries in the current frame.

Or, as another example, the settings that override inconsistent values (of syntax elements from the bitstream) include reference frame assignments for the current frame. In this scenario, the host decoder can enable error concealment or trick mode processing and, in response to error concealment or trick mode processing being enabled, determine appropriate reference frame assignments for the current frame. In particular, for error concealment, the appropriate reference frame assignments can be set to avoid references to missing reference frames. Or, for a trick mode such as slow forward or slow reverse, appropriate reference frame assignments can be set to new reference frames when additional frames are created by interpolation.

Or, as another example, the settings that override inconsistent values (of syntax elements from the bitstream) include an indicator of whether or not to display the current frame after decoding. In this scenario, the host decoder can enable trick mode processing and, in response to trick mode processing being enabled, change the indicator of whether or not to display the current frame after decoding. This approach can be used, for example, to decode but not display a frame that is to be used as a reference frame but not yet displayed.

Alternatively, the settings that override inconsistent values (of syntax elements from the bitstream) include other and/or additional settings in a picture parameter data structure or other data structure for the current frame.

Figure 17:
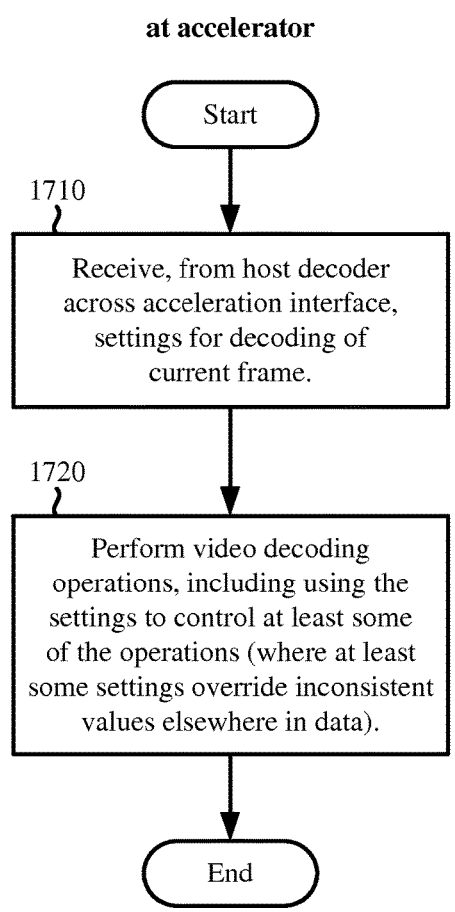

FIG. 17 illustrates a generalized technique (1700) for using settings that override values of syntax elements of a bitstream, from the perspective of an accelerator in communication with a host decoder across an acceleration interface. The accelerator receives (1710), from the host decoder across the acceleration interface, settings for decoding of a current frame of video. For example, the settings are transferred as part of data based at least in part on an uncompressed frame header for a compressed frame of a VP9 bitstream. Or, as another example, the settings are transferred as part of data based at least in part on a compressed frame of a VP8 bitstream. The accelerator performs (1720) video decoding operations for the current frame. In doing so, the accelerator uses the settings to control at least some of the video decoding operations for the current frame. At least some of the settings override inconsistent values elsewhere in data for the current frame, in which case the accelerator complies with the settings from the host decoder. For example, the settings that override inconsistent values (of syntax elements from the bitstream) include: (1) settings to disable deblock filtering of block boundaries in the current frame, (2) reference frame assignments for the current frame, (3) an indicator of whether or not to display the current frame after decoding, and/or (4) some other settings in a picture parameter data structure or other data structure for the current frame.

VI. Using Surface Frame Indices to Indicate Updates to Reference Frame Buffers

This section describes innovations that relate to using surface frame indices to indicate updates to reference frame buffers. A host decoder assigns surface index values used by an accelerator based on bitstream syntax elements, which indicate how to update reference frame buffers (according to rules for a codec format such as VP8 or VP9). The accelerator uses such surface index values (instead of using the bitstream syntax elements) to update reference frame buffers in the accelerator. In some cases, by assigning surface index values based on syntax elements in the bitstream, the host decoder can simplify reference frame management and other processing by the accelerator, facilitating stateless operation according to which reference frame buffer handling is performed under the control of the host decoder, rather than being determined from the bitstream by the accelerator. Also, the host decoder can assign surface index values that override updates indicated by syntax elements in the bitstream, in order to provide error concealment functionality or trick mode functionality.

Figure 18A:
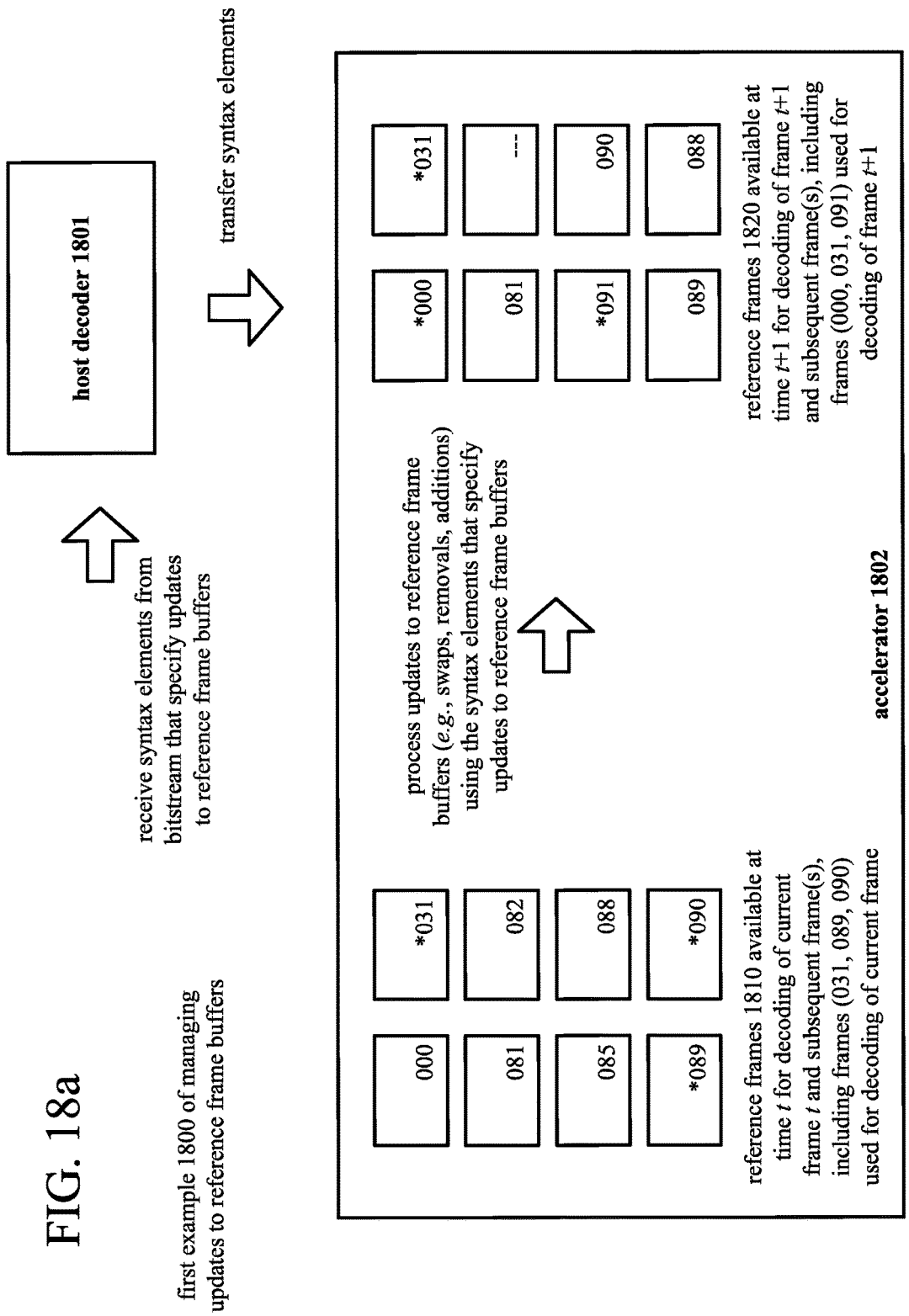
FIG. 18a is a diagram illustrating an example of managing updates to reference frame buffers in an accelerator based on syntax elements in a bitstream.

For comparison, FIG. 18a illustrates an example (1800) of managing updates to reference frame buffers in an accelerator based on syntax elements in a bitstream. The host decoder (1801) receives syntax elements from a bitstream that specify updates to reference frame buffers. For example, for a VP8 bitstream, the syntax elements include refresh_golden_frame, refresh_alternate_frame, copy_buffer_to_golden, copy_buffer_to_alternate, and refresh_last for a current frame. Or, as another example, for a VP9 bitstream, the syntax elements include refresh_frame_flags for a current frame, as well as syntax elements indicating which three reference frames can be used for the current frame. The host decoder (1801) transfers the syntax elements to the accelerator (1802), which processes updates to reference frame buffers (e.g., swaps, removals, additions) using the syntax elements that specify updates to reference frame buffers.

In FIG. 18a, the reference frames (1810) available at time t, for decoding of current frame t and subsequent frame(s), includes eight reference frames (labeled 000, 031, 081, 082, 085, 088, 089, and 090). The labels generally indicate decoding order, for the sake of illustration, and need not correspond to values tracked by the accelerator. A given reference frame can precede or follow the current frame in display order, or not be displayed at all. The set of reference frames (1810) includes three frames (labeled 031, 089, 090, which are designated with an asterisk) used for decoding of the current frame. FIG. 18a also shows a set of reference frames (1820) available at time t+1, for decoding of frame t+1 and subsequent frame(s), which includes seven reference frames (labeled 000, 031, 081, 088, 089, 090, 091). The set of reference frames (1820) includes three frames (labeled 000, 031, 091, which are designated with an asterisk) used for decoding of the frame t+1. When it updates the reference frame buffers, the accelerator can remove a reference frame (e.g., frames labeled 082 and 085 in FIG. 18a), add a reference frame (e.g., frame labeled 091 in FIG. 18a), and/or swap the positions of reference frames in buffers (e.g., frames labeled 088 and 090 in FIG. 18a). The accelerator can also change which reference frames are used in motion compensation for the current frame (e.g., frames labeled 031, 089, 090 versus frames labeled 000, 031, 091 in FIG. 18a). When the accelerator manages updates to reference frame buffers (as in FIG. 18a), the accelerator tracks reference frame usage and applies the rules for updating buffers, which adds complexity to the accelerator. Also, the accelerator must follow the updates indicated by the syntax elements in the bitstream, which may make sense for core decoding but not make sense for other scenarios (e.g., error concealment, trick mode processing).

In contrast, FIG. 18b illustrates an example (1850) of managing updates to reference frame buffers in an accelerator based on surface index values. In the example (1850), the host decoder and accelerator use data structures of the example interface specification described in section III.A.

Like the host decoder (1801) in FIG. 18a, the host decoder (1851) of FIG. 18b receives syntax elements from a bitstream that specify updates to reference frame buffers. For example, for a VP8 bitstream, the syntax elements include refresh_golden_frame, refresh_alternate_frame, copy_buffer_to_golden, copy_buffer_to_alternate, and refresh_last for a current frame. Or, as another example, for a VP9 bitstream, the syntax elements include refresh_frame_flags for a current frame, as well as syntax elements indicating which three reference frames can be used for the current frame. Unlike the host decoder (1801) in FIG. 18a, during the process of ingesting the bitstream, the host decoder (1851) assigns surface index values that indicate reference frame assignments. For example, to determine the surface index values, the host decoder (1851) interprets the syntax elements and applies rules for updating reference frame buffers according to the codec format. The structure of a surface index value can be a structure described in section III.A or other structure. For a frame of a VP9 bitstream, for example, the host decoder (1851) assigns surface index values in a ref_frame_map[ ] structure and frame_refs[ ] structure. Or, as another example, for a frame of a VP8 bitstream, the host decoder (1851) assigns surface index values to alt_fb_idx, gld_fb_idx, and 1st_fb_idx. The host decoder (1851) can assign surface index values that are consistent with values of the received bitstream syntax elements. Or, the host decoder (1851) can assign surface index values that are inconsistent with values of the received bitstream syntax elements (e.g., to support error concealment or trick mode processing).

The host decoder (1851) transfers the surface index values to the accelerator (1852), e.g., as part of a picture parameters data structure in a data buffer. The accelerator (1852) processes updates to reference frame buffers (e.g., swaps, removals, additions) using the surface index values that indicate reference frame assignments. In FIG. 18b, the updates are the same as in FIG. 18a, but alternatively the updates indicated with the surface index values can be inconsistent with values of the received bitstream syntax elements, causing different updates to reference frame buffers in the accelerator (1852).

FIG. 19 illustrates a generalized technique (1900) for using surface index values to update reference frame buffers, from the perspective of a host decoder in communication with an accelerator across an acceleration interface. The host decoder receives (1910) at least part of a bitstream of encoded data for video, which includes syntax elements that indicate how to update reference frame buffers. The host decoder manages (1920) at least some video decoding operations of the accelerator across the acceleration interface. In particular, the host decoder uses at least some of the syntax elements to assign surface index values that indicate reference frame assignments for a current frame of the video. For example, the syntax elements include multiple flags that indicate which of the reference frame buffers, if any, to update, and the host decoder applies any updates indicated by the syntax elements, according to rules defined for decoding, to determine the surface index values that indicate the reference frame assignments for the current frame.

The host decoder transfers, to the accelerator across the acceleration interface, the surface index values that indicate the reference frame assignments for the current frame. Each of the surface index values can be an index of an uncompressed surface buffer accessible to the accelerator. For example, each of the surface index values is represented using the data structure (300) shown in FIG. 3. Alternatively, the surface index values are represented using another structure.

The surface index values can indicate a set of reference frames available for decoding of the current frame and any subsequent frames. For example, as in the ref_frame_map[ ] structure in the VP9 picture parameters data structure (400) of FIG. 4, the surface index values include members of a data structure that identify available reference frames for the current frame and/or one or more subsequent frames.

The surface index values can also indicate a set of reference frames that may be used in motion compensation for blocks of the current frame. For example, as in the frame_refs[ ] structure in the VP9 picture parameters data structure (400) of FIG. 4, the surface index values include members of a data structure that identify a subset of the available reference frames, which may be referenced in motion compensation for blocks of the current frame. Or, as another example, as in the alt_fb_idx, alt_fb_idx, gld_fb_idx, and 1st_fb_idx members in the VP8 picture parameters data structure (600) of FIGS. 6a and 6b, the surface index values include indicators of available reference frames that may be referenced in motion compensation for blocks of the current frame.

When the host decoder assigns surface index values to reference frames, the host decoder typically also assigns a surface index value to the current frame. For example, as part of managing the at least some video decoding operations of the accelerator, the host decoder assigns a surface index value to the current frame and transfers, to the accelerator across the acceleration interface, the surface index value of the current frame. In the VP9 picture parameters data structure (400) of FIG. 4, and in the VP8 picture parameters data structure (600) of FIGS. 6a and 6b, the surface index value of the current frame is indicated by CurrPic.

FIG. 20 illustrates a generalized technique (2000) for using surface index values to update reference frame buffers, from the perspective of an accelerator in communication with a host decoder across an acceleration interface. The accelerator receives (2010), from the host decoder across the acceleration interface, surface index values that indicate reference frame assignments for a current frame of video. Each of the surface index values can be an index of an uncompressed surface buffer accessible to the accelerator. For example, each of the surface index values is represented using the data structure (300) shown in FIG. 3. Alternatively, the surface index values are represented using another structure. As explained with reference to FIG. 19, the surface index values can indicate a set of reference frames available for decoding of the current frame and any subsequent frames, and the surface index values can also indicate a set of reference frames that may be used in motion compensation for blocks of the current frame. The accelerator then performs (2020) video decoding operations. In doing so, the accelerator uses the surface index values to update reference frame buffers and identify reference frames.

When the accelerator receives surface index values assigned to reference frames, the accelerator typically also receives a surface index value assigned to the current frame. For example, the accelerator receives, from the host decoder across the acceleration interface, a surface index value for the current frame.

VII. Switching Spatial Resolution at Non-key Frames

This section describes innovations that relate to switching of spatial resolution at non-key frames during decoding. In some codec formats (e.g., VP9), spatial resolution can switch at key frames or at non-key frames. By selectively scaling references frames, an accelerator can handle dynamic changes in spatial resolution during decoding, even when spatial resolution changes at a non-key frame.

For comparison, in many video codec standards, spatial resolution can change only at key frames. In some accelerators for such codec standards, at a resolution switch, a new instance of decoder (including a new instance of host decoder) is created to begin decoding at the new key frame. For example, suppose resolution switches from 720 p to ultra high definition ("UHD") at a key frame. A first decoder (instance of host decoder) decodes frames of 720 p video before the key frame. At the key frame, a second decoder (different instance of host decoder) starts to decode frames of UHD video. In contrast, according to innovations described in this section, an accelerator handles changes in spatial resolution at non-key frames using scaling operations on reference frames.

FIGS. 21a and 21b show an example of scaling of a reference frame when switching spatial resolution at a non-key frame during decoding. In FIG. 21a, a series of frames in decoding order includes three frames at a first spatial resolution (e.g., 720 p, 1080 p) and two frames at a second spatial resolution (e.g., UHD) different than the first spatial resolution. The three frames at the first spatial resolution include a previous frame (2111), which is a key frame at the first spatial resolution. The two frames at the second spatial resolution include the current frame (2120), which is a non-key frame. Spatial resolution switches at the current frame (2120).

As shown in FIG. 21b, the decoding of the current frame (2120) uses motion compensation relative to scaled versions of reference frames that originally have a different spatial resolution. The accelerator stores reference frames (2110) at the first spatial resolution (e.g., in a reference frame area that buffers up to eight reference frames tracked by the host decoder and accelerator). In FIG. 21b, the three reference frames (2110) are labeled 088, 089, and 090. The labels generally indicate decoding order, for the sake of illustration, and need not correspond to values tracked by the accelerator. The accelerator scales the reference frames (2110), producing scaled versions (2130) of the reference frames at the second spatial resolution, which matches the spatial resolution of the current frame (2120). The scaled versions (2130) of the reference frames are labeled 088', 089', and 090' for the sake of illustration, but the labels need not correspond to values tracked by the accelerator. Then, the accelerator performs motion compensation for blocks of the current frame (2120) using motion-compensated prediction values from the scaled versions (2130) of the reference frames.

The accelerator can store the scaled versions (2130) of the reference frames in internal memory of the accelerator. For example, the accelerator creates a new surface frame buffer for each new scaled version of a reference frame. The accelerator can create scaled reference frames on-the-fly, as needed during decoding of the current frame (2120), for those reference frames used to decode the current frame (2120). The accelerator can retain the scaled versions (2130) of reference frames in internal memory, in case a later frame uses one of the scaled reference frames for motion compensation. Or, the accelerator can remove the scaled versions (2130) from memory when decoding of the current frame (2120) finishes.

In example implementations, the scaled versions (2130) of reference frames do not count towards any limit on available reference frames according to a codec format. Since each frame can have a different spatial resolution, the accelerator may create multiple scaled versions of the same reference frame, potentially resulting in heavy usage of internal memory for scaled reference frames and/or heavy computational load for scaling. For example, if there are six different spatial resolutions, the accelerator may create up to five scaled versions of a given reference frame. In practice, however, spatial resolution switches are rare in most scenarios.

FIG. 21b shows an example of upscaling of reference frames. When the spatial resolution of the current frame is less than the spatial resolution of a reference frame, the accelerator can downscale the reference frame. For downscaling, the accelerator can allocate frame buffers at a maximum resolution (such as UHD resolution or 1080 p) or other resolution, then use only part of a given frame buffer for a given frame at a lower resolution (such as 720 p). (In general, the maximum spatial resolution of video is not indicated in a VP9 bitstream, but an application can provide information about maximum spatial resolution.) Cropping information can indicate the location and dimensions of a sub-section of real samples within a frame buffer. Suppose a frame buffer has a size of 1920×1280. The cropping information can be, e.g., (0,0) to (1280, 720), indicating the top-left corner and bottom-right corner of the real samples for the scaled reference frame in the frame buffer. The actual content can be stored in any sub-section of the frame buffer (at least theoretically)—the sub-section need not start at (0, 0).

Aside from reference frames, the frame buffer for the current frame can have the maximum spatial resolution, with cropping information indicating the location and dimensions of the current frame in the frame buffer. In this case, the host decoder gives the cropping information to display hardware when the current frame is displayed. The decoding pipeline can switch display hardware right before display of the current frame at a new spatial resolution.

FIG. 22 illustrates a generalized technique (2200) for switching spatial resolution at a non-key frame during video decoding, from the perspective of an accelerator in communication with a host decoder across an acceleration interface. FIG. 23 shows an example technique (2300) for switching spatial resolution at a non-key frame during video decoding, from the perspective of the accelerator.

With reference to FIG. 22, the accelerator receives (2210), from the host decoder across the acceleration interface, data for a current frame of video. The current frame is a non-key frame having a first spatial resolution. The accelerator performs (2220) video decoding operations using the data for the current frame. In doing so, the accelerator scales a reference frame from a second spatial resolution to the first spatial resolution. For example, the accelerator follows the approach shown in FIG. 23. Alternatively, the accelerator scales the reference frame from the second spatial resolution to the first spatial resolution in some other way.

With reference to FIG. 23, the accelerator identifies (2310) a reference frame having a second spatial resolution different than the first spatial resolution. The accelerator allocates (2320), in temporary internal memory, an uncompressed surface buffer. For example, the uncompressed surface buffer is allocated to have a maximum spatial resolution. The temporary internal memory can be accessible to the accelerator but not the host decoder.

The accelerator scales (2330) the reference frame to the first spatial resolution. The scaling can be scaling up from the second spatial resolution to the first spatial resolution, or it can be scaling down from the second spatial resolution to the first spatial resolution. The accelerator stores (2340) the scaled reference frame in the uncompressed surface buffer. When the uncompressed surface buffer is allocated to have a maximum spatial resolution, cropping information can indicate location and/or dimensions of samples of the scaled reference frame in the uncompressed surface buffer. Finally, the accelerator performs (2350) motion compensation for at least some blocks of the current frame relative to portions of the scaled reference frame. Subsequently, the scaled reference frame can be retained in the uncompressed surface buffer for use in motion compensation of one or more other frames of the video.

The accelerator can also buffer, in a second uncompressed surface buffer accessible to the accelerator and to the host decoder, the current frame. When the second uncompressed surface buffer is allocated to have a maximum spatial resolution, cropping information can indicate one or more of location and dimensions of samples of the current frame in the second uncompressed surface buffer.

VIII. Managing Display

In terms of managing display, the host decoder and accelerator can handle different cases for changes in spatial resolution during decoding. For example, if the decoded height and width for a current frame are less than a rendering target resolution, whether the current frame is a key frame or non-key frame, the accelerator can provide a reconstructed version of the current frame at the decoded height and width. The host decoder (or an application) can handle post-processing operations to upscale the current frame (e.g., setting a source rectangle of appropriate dimensions).

As another example, if the decoded height and width for a current frame are more than the rendering target resolution, and the current frame is a key frame, the host decoder can reset at the key frame. The reset may be inefficient, but the cost is usually acceptable if switches in spatial resolution are rare. Or, if information about maximum spatial resolution is available, frame buffers of the maximum spatial resolution can be used, as described above.

As another example, if the decoded height and width for a current frame are more than the rendering target resolution, and the current frame is a non-key frame, there are several options. Simply restarting the host decoder is problematic, since any reference frames are lost. Alternatively, the accelerator can decode the current frame into temporary memory and output a scaled-down resolution at the rendering target resolution. In this case, the accelerator can use the temporary memory for reference frames. Or, as another alternative, the host decoder can drop any non-key frames until the next key frame, hiding spatial resolution changes at non-key frames from the accelerator. Or, when spatial resolution increases at the non-key frame, the accelerator upscales reference frames (as shown in FIG. 21b) and outputs the high-resolution version of the current frame to a surface frame buffer provided by the host decoder. This may result in a large number of extra surface frame buffers being allocated by the host decoder, with multiple sets of surface frame buffers active at the same time for reference frames/decoding and for display/output purposes.

Or, as another alternative, to handle all cases, the host decoder can query the accelerator for the maximum supported height and width, and allocate render targets to the maximum supported height and width. The accelerator will produce decoded frames at the decoded height and width in the render targets. The host decoder (or an application) can perform scaling during post-processing operations. While this approach handles various configurations of decoded width/height and display width/height, it can waste a significant amount of memory for frame buffers (e.g., if UHD frame buffers are allocated for VGA frames).

IX. Handling Skipped Frames Without Invoking Accelerator

This section describes innovations that relate to a host decoder handling skipped frames without invoking an accelerator. In this way, the host decoder can efficiently provide skipped frame functionality while bypassing the accelerator for decoding.

In the VP9 format, a skipped frame is indicated by a small number of syntax elements in the bitstream. In a VP9 bitstream, for example, a single bit can indicate whether or not the current frame is skipped. If the current frame is skipped, another syntax element in the VP9 bitstream can indicate which of the available reference frames to repeat for the current frame. For example, if reference frame buffers store up to eight reference frames, a three-bit syntax element can indicate which of the eight reference frames to display in place of the current frame. A skipped frame in a VP9 bitstream lacks other syntax elements in the bitstream, which makes signaling of skipped frames very efficient. In the VP8 format, or at least variations thereof, one or more syntax elements can similarly indicate a skipped frame.

Figure 24:
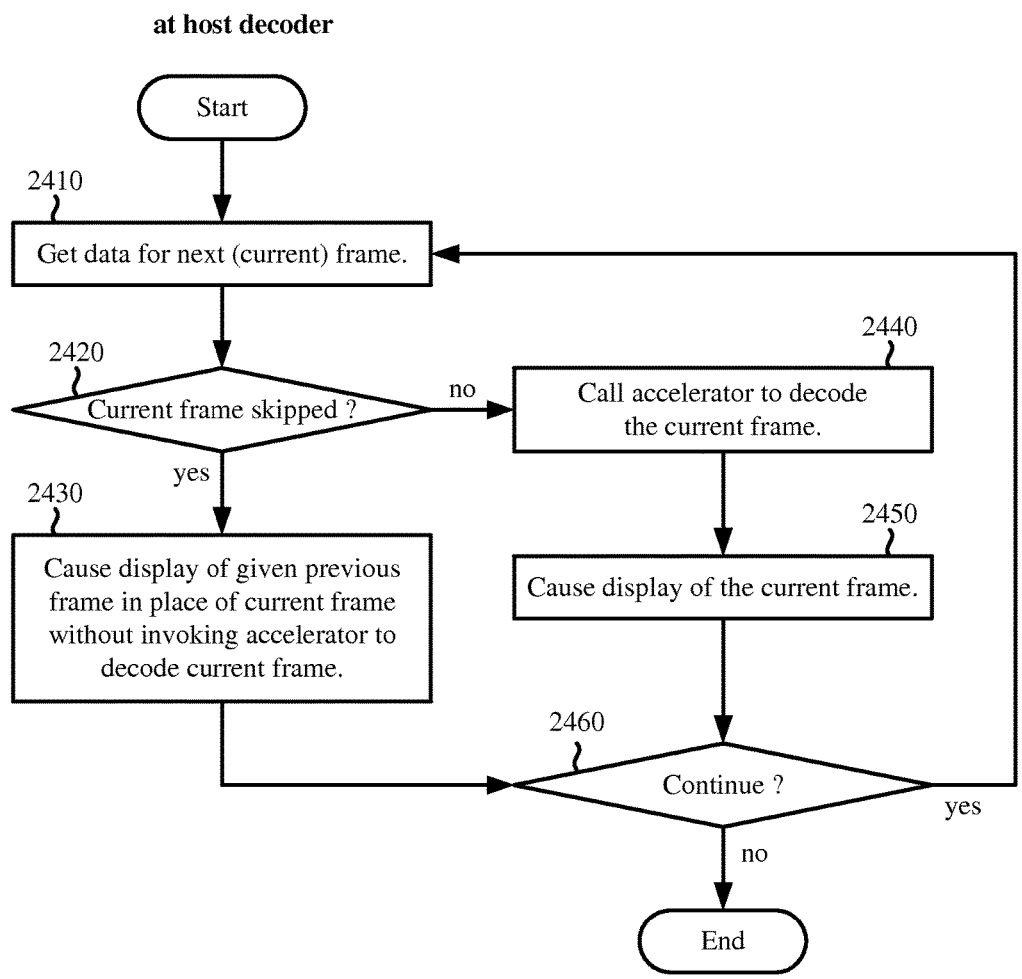
FIG. 24 is a flowchart illustrating an example technique for handling skipped frames, from the perspective of a host decoder.

FIG. 24 illustrates an example technique (2400) for handling skipped frames, from the perspective of a host decoder. The host decoder gets (2410) data for the current frame and checks (2420) whether the current frame is skipped. If so, the host decoder causes (2430) display of a given previous frame in place of the current frame, without invoking the accelerator to decode the current frame. The host decoder already handles the decision to display or not display a frame. To repeat the display of the given previous frame, the host decoder can change a display flag associated with the given previous frame from "no display" to "display." Otherwise (current frame is not skipped), the host decoder calls (2440) the accelerator to decode the current frame and causes (2450) display of the current frame, if appropriate. The host decoder checks (2460) whether to continue and, if so, continues by getting (2410) data for the next frame.

Figure 25:
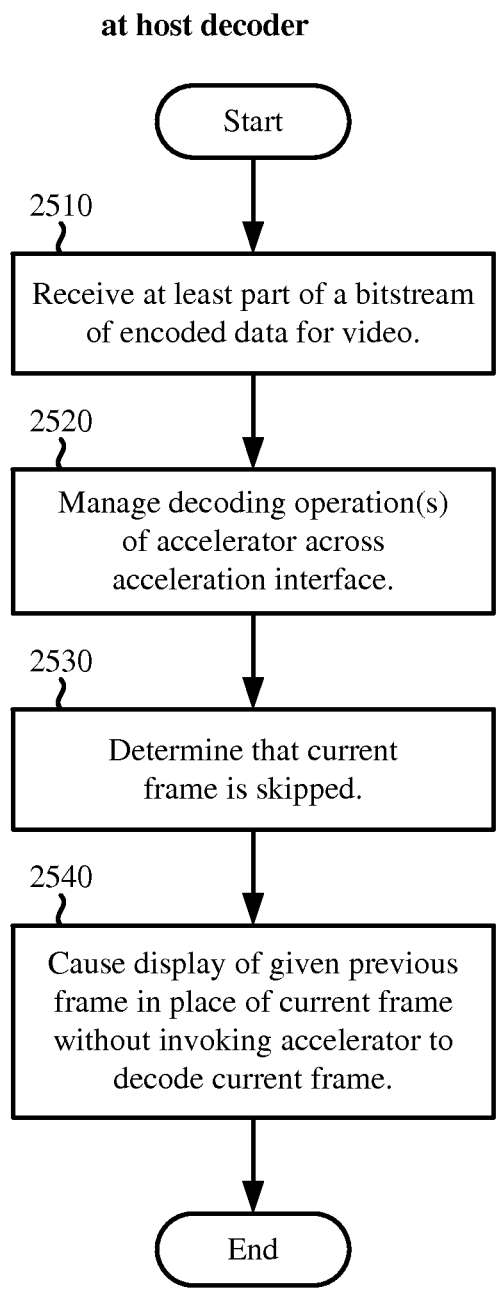
FIG. 25 is a flowchart illustrating a generalized technique for handling skipped frames, from the perspective of a host decoder.

FIG. 25 is a flowchart illustrating a generalized technique (2500) for handling a skipped frame, from the perspective of a host decoder. The host decoder receives (2510) at least part of a bitstream of encoded data for video. The host decoder manages (2520) at least some video decoding operations of the accelerator across the acceleration interface. For example, before encountering the skipped frame, the host decoder transfers, to the accelerator across the acceleration interface, data for one or more frames of the video for decoding by the accelerator. (The one or more frames include a "previous" frame that is repeated in place of a current frame.)

Later, the host decoder determines (2530) that a current frame of the video is skipped. For example, the host decoder parses, from the at least part of the bitstream, a syntax element that indicates whether or not the current frame is skipped, and determines the current frame is skipped based on the syntax element. Alternatively, the host decoder determines that the current frame is skipped in some other way (e.g., by parsing and interpreting a field of a container format).

The host decoder causes (2540) display of a given previous frame of the video in place of the current frame, without invoking the accelerator to decode the current frame. For example, a reference frame area buffers the given previous frame, and the host decoder causes display of the given previous frame by changing a display indicator associated with the given previous frame. Alternatively, the host decoder causes display of the given previous frame in some other way.

In some implementations, the reference frame area buffers multiple frames (including the given previous frame). In this case, the host decoder can identify the given previous frame among the multiple frames based on an identifier of the given previous frame that is signaled in the bitstream for the current frame, and parsed from the bitstream after the host decoder determines the current frame is skipped. Or, the host decoder can identify the given previous frame among the multiple frames based on display order (e.g., selecting the frame that immediately precedes the current frame in display order, or selecting the frame that was most recently decoded and displayed).

X. Features.

Different embodiments may include one or more of the inventive features shown in the following table of features.

| # | Feature |
|---|---------|
| | A. Switching Spatial Resolution at Non-Key Frames in Accelerator. |
| A1 | In a computer system that includes a host decoder and an accelerator in communication with the host decoder across an acceleration interface, a method comprising: at the accelerator, receiving, from the host decoder across the acceleration interface, data for a current frame of video, wherein the current frame is a non-key frame having a first spatial resolution; and with the accelerator, performing video decoding operations using the data for the current frame, including: identifying a reference frame having a second spatial resolution different than the first spatial resolution; allocating, in temporary internal memory, an uncompressed surface buffer; scaling the reference frame to the first spatial resolution; storing, in the uncompressed surface buffer, the scaled reference frame; and performing motion compensation for at least some blocks of the current frame relative to portions of the scaled reference frame. |

| # | Feature |
|---|---|
| A2 | The method of claim A1 wherein the temporary internal memory is accessible to the accelerator but not the host decoder. |
| A3 | The method of claim A1 wherein the scaled reference frame is stored in the uncompressed surface buffer for use in motion compensation of one or more other frames of the video. |
| A4 | The method of claim A1 wherein the uncompressed surface buffer is allocated to have a maximum spatial resolution, and wherein cropping information indicates one or more of location and dimensions of samples of the scaled reference frame in the uncompressed surface buffer. |
| A5 | The method of claim A1 wherein the uncompressed surface buffer is allocated to have a maximum spatial resolution, and wherein the scaling comprises scaling up from the second spatial resolution to the first spatial resolution. |
| A6 | The method of claim A1 wherein the uncompressed surface buffer is allocated to have a maximum spatial resolution, and wherein the scaling comprises scaling down from the second spatial resolution to the first spatial resolution. |
| A7 | The method of claim A1 wherein the performing the video decoding operations further comprises:<br>buffering, in a second uncompressed surface buffer accessible to the accelerator and to the host decoder, the current frame. |
| A8 | The method of claim A7 wherein the second uncompressed surface buffer is allocated to have a maximum spatial resolution, and wherein cropping information indicates one or more of location and dimensions of samples of the current frame in the second uncompressed surface buffer. |
| A9 | The method of claim A1 wherein the data for the current frame includes:<br>data based at least in part on an uncompressed frame header for the current frame, the data based at least in part on the uncompressed frame header being received in a first buffer;<br>a compressed frame header for the current frame, the compressed frame header being received in a second buffer different than the first buffer; and<br>compressed video data for the current frame, the compressed video data being received in the second buffer. |
| A10 | The method of claim A1 wherein the data for the current frame includes surface index values that indicate reference frame assignments for the current frame. |
| A11 | The method of claim A1 wherein the data for the current frame includes settings for decoding of the current frame, and wherein at least some of the settings override inconsistent values elsewhere in the data for the current frame.<br>B. Host Decoder Separately Transferring Data for Uncompressed Frame Header and Compressed Frame Header for Current Frame. |
| B1 | In a computer system that includes a host decoder and an accelerator in communication with the host decoder across an acceleration interface, a method comprising:<br>at the host decoder, receiving at least part of a bitstream of encoded data for video; and<br>with the host decoder, managing at least some video decoding operations of the accelerator across the acceleration interface, including:<br>parsing, from the at least part of the bitstream, an uncompressed frame header for a current frame of the video;<br>transferring, to the accelerator across the acceleration interface, data based at least in part on the uncompressed frame header in a first buffer; and<br>transferring, to the accelerator across the acceleration interface, a compressed frame header for the current frame in a second buffer different than the first buffer. |
| B2 | The method of claim B1 wherein the data based at least in part on the uncompressed frame header includes one or more of:<br>settings for decoding tools that apply for the current frame;<br>reference frame assignments for the current frame;<br>settings for inverse quantization of quantized transform coefficients of the current frame;<br>settings for deblock filtering of block boundaries in the current frame; and<br>segmentation parameters for blocks of the current frame. |
| B3 | The method of claim B1 wherein the compressed frame header includes entropy-coded data indicating probabilities of values of entropy-coded syntax elements for the current frame. |
| B4 | The method of claim B1 wherein the managing the at least some video decoding operations of the accelerator further comprises:<br>transferring, to the accelerator across the acceleration interface, compressed frame data for the current frame in the second buffer. |
| B5 | The method of claim B4 wherein the compressed frame data includes one or more of:<br>mode data for blocks of the current frame;<br>motion vector data for blocks of the current frame;<br>quantized transform coefficient data for blocks of the current frame; and<br>other data for blocks of the current frame. |

| # | Feature |
|---|---|
| B6 | The method of claim B4 wherein the managing the at least some video decoding operations of the accelerator further comprises:<br>transferring, to the accelerator across the acceleration interface, a copy of the uncompressed frame header in the second buffer along with the compressed frame header and the compressed frame data, wherein a variable in the data based at least in part on the uncompressed frame header indicates size of the uncompressed frame header, thereby helping the accelerator skip parsing of the uncompressed frame header in the second buffer. |
| B7 | The method of claim B1 wherein the data based at least in part on the uncompressed frame header for the current frame includes surface index values that indicate reference frame assignments for the current frame. |
| B8 | The method of claim B1 wherein the data based at least in part on the uncompressed frame header for the current frame includes settings for decoding of the current frame, and wherein at least some of the settings override inconsistent values elsewhere in data for the current frame. |
| B9 | The method of claim B1 further comprising:<br>with the host decoder, determining that a next frame of the video is skipped; and<br>with the host decoder, causing display of a given previous frame of the video in place of the next frame without invoking the accelerator to decode the next frame. |
| | C. Accelerator Separately Receiving Data for Uncompressed Frame Header and Compressed Frame Header for Current Frame. |
| C1 | In a computer system that includes a host decoder and an accelerator in communication with the host decoder across an acceleration interface, a method comprising:<br>at the accelerator, receiving in a first buffer, from the host decoder across the acceleration interface, data based at least in part on an uncompressed frame header for a current frame of video;<br>at the accelerator, receiving in a second buffer different than the first buffer, from the host decoder across the acceleration interface, a compressed frame header for the current frame; and<br>with the accelerator, performing video decoding operations using the data based at least in part on the uncompressed frame header and the compressed frame header. |
| C2 | The method of claim C1 wherein the data based at least in part on the uncompressed frame header includes one or more of:<br>settings for decoding tools that apply for the current frame;<br>reference frame assignments for the current frame;<br>settings for inverse quantization of quantized transform coefficients of the current frame;<br>settings for deblock filtering of block boundaries in the current frame; and<br>segmentation parameters for blocks of the current frame. |
| C3 | The method of claim C1 wherein the compressed frame header includes entropy-coded data indicating probabilities of values of entropy-coded syntax elements for the current frame. |
| C4 | The method of claim C1 further comprising:<br>at the accelerator, receiving in the second buffer, from the host decoder across the acceleration interface, compressed frame data for the current frame, wherein the performing the video decoding operations also uses the compressed frame data. |
| C5 | The method of claim C4 wherein the compressed frame data includes one or more of:<br>mode data for blocks of the current frame;<br>motion vector data for blocks of the current frame;<br>quantized transform coefficient data for blocks of the current frame; and<br>other data for blocks of the current frame. |
| C6 | The method of claim C4 further comprising:<br>at the accelerator, receiving in the second buffer, from the host decoder across the acceleration interface, a copy of the uncompressed frame header for the current frame, wherein a variable in the data based at least in part on the uncompressed frame header indicates size of the uncompressed frame header, thereby helping the accelerator skip parsing of the uncompressed frame header in the second buffer. |
| C7 | The method of claim C4 wherein the current frame is a non-key frame having a first spatial resolution, and wherein the performing the video decoding operations includes:<br>identifying a reference frame having a second spatial resolution different than the first spatial resolution;<br>allocating, in temporary internal memory, an uncompressed surface buffer;<br>scaling the reference frame to the first spatial resolution;<br>storing, in the uncompressed surface buffer, the scaled reference frame; and<br>performing motion compensation for at least some blocks of the current frame relative to portions of the scaled reference frame. |

-continued

| # | Feature |
|---|---|
| C8 | The method of claim C1 wherein the data based at least in part on the uncompressed frame header for the current frame includes surface index values that indicate reference frame assignments for the current frame. |
| C9 | The method of claim C1 wherein the data based at least in part on the uncompressed frame header for the current frame includes settings for decoding of the current frame, and wherein at least some of the settings override inconsistent values elsewhere in data for the current frame. |
| | D. Host Decoder Assigning and Transferring Surface Index Values that Indicate Reference Frame Assignments. |
| D1 | In a computer system that includes a host decoder and an accelerator in communication with the host decoder across an acceleration interface, a method comprising: at the host decoder, receiving at least part of a bitstream of encoded data for video, the at least part of the bitstream including syntax elements that indicate how to update reference frame buffers; and with the host decoder, managing at least some video decoding operations of the accelerator across the acceleration interface, including: using at least some of the syntax elements to assign surface index values that indicate reference frame assignments for a current frame of the video; and transferring, to the accelerator across the acceleration interface, the surface index values that indicate the reference frame assignments for the current frame. |
| D2 | The method of claim D1 wherein each of the surface index values is an index of an uncompressed surface buffer accessible to the accelerator. |
| D3 | The method of claim D1 wherein the surface index values include members of a first data structure and members of a second data structure, wherein: the members of the first data structure identify available reference frames for the current frame and/or one or more subsequent frames; and the members of the second data structure identify a subset of the available reference frames that may be referenced in motion compensation for blocks of the current frame. |
| D4 | The method of claim D1 wherein the surface index values include: indicators of available reference frames that may be referenced in motion compensation for blocks of the current frame. |
| D5 | The method of claim D1 wherein the managing the at least some video decoding operations of the accelerator further includes: assigning a surface index value to the current frame; and transferring, to the accelerator across the acceleration interface, the surface index value of the current frame. |
| D6 | The method of claim D1 wherein the syntax elements include multiple flags that indicate which of the reference frame buffers, if any, to update, and wherein the using the at least some of the syntax elements to assign surface index values includes: applying any updates indicated by the syntax elements, according to rules defined for decoding, to determine the surface index values that indicate the reference frame assignments for the current frame. |
| D7 | The method of claim D1 wherein the surface index values are part of data based at least in part on an uncompressed frame header for the current frame, the data based at least in part on the uncompressed frame header being transferred in a first buffer, the managing at least some video decoding operations of the accelerator further comprising: transferring, to the accelerator across the acceleration interface, a compressed frame header for the current frame, the compressed frame header being transferred in a second buffer different than the first buffer; and transferring, to the accelerator across the acceleration interface, compressed video data for the current frame, the compressed video data being transferred in the second buffer. |
| D8 | The method of claim D1 wherein at least some of the reference frame assignments override inconsistent values elsewhere in data for the current frame. |
| D9 | The method of claim D1 further comprising: with the host decoder, determining that a next frame of the video is skipped; and with the host decoder, causing display of a given previous frame of the video in place of the next frame without invoking the accelerator to decode the next frame. |

| # | Feature |
|---|---|
| | E. Accelerator Receiving and Using Surface Index Values that Indicate Reference Frame Assignments. |
| E1 | In a computer system that includes a host decoder and an accelerator in communication with the host decoder across an acceleration interface, a method comprising:<br>at the accelerator, receiving, from the host decoder across the acceleration interface, surface index values that indicate reference frame assignments for a current frame of video; and<br>with the accelerator, performing video decoding operations, including using the surface index values to update reference frame buffers and identify reference frames. |
| E2 | The method of claim E1 wherein each of the surface index values is an index of an uncompressed surface buffer accessible to the accelerator. |
| E3 | The method of claim E1 wherein the surface index values include members of a first data structure and members of a second data structure, wherein:<br>the members of the first data structure identify available reference frames for the current frame and/or or more subsequent frames; and<br>the members of the second data structure identify a subset of the available reference frames that may be referenced in motion compensation for blocks of the current frame. |
| E4 | The method of claim E1 wherein the surface index values include:<br>indicators of available reference frames that may be referenced in motion compensation for blocks of the current frame. |
| E5 | The method of claim E1 further comprising:<br>at the accelerator, receiving, from the host decoder across the acceleration interface, a surface index value for the current frame. |
| E6 | The method of claim E1 wherein the current frame is a non-key frame having a first spatial resolution, and wherein the performing the video decoding operations includes:<br>identifying a reference frame having a second spatial resolution different than the first spatial resolution;<br>allocating, in temporary internal memory, an uncompressed surface buffer;<br>scaling the reference frame to the first spatial resolution;<br>storing, in the uncompressed surface buffer, the scaled reference frame; and<br>performing motion compensation for at least some blocks of the current frame relative to portions of the scaled reference frame. |
| E7 | The method of claim E1 wherein the surface index values are part of data based at least in part on an uncompressed frame header for the current frame, the data based at least in part on the uncompressed frame header being received in a first buffer, the method further comprising:<br>receiving, from the host decoder across the acceleration interface, a compressed frame header for the current frame, the compressed frame header being received in a second buffer different than the first buffer; and<br>receiving, from the host decoder across the acceleration interface, compressed video data for the current frame, the compressed video data being received in the second buffer. |
| E8 | The method of claim E1 wherein at least some of the reference frame assignments override inconsistent values elsewhere in data for the current frame. |
| | F. Host Decoder Handling Skipped Frames Without Accelerator. |
| F1 | In a computer system that includes a host decoder and an accelerator in communication with the host decoder across an acceleration interface, a method comprising:<br>at the host decoder, receiving at least part of a bitstream of encoded data for video;<br>with the host decoder, managing at least some video decoding operations of the accelerator across the acceleration interface;<br>with the host decoder, determining that a current frame of the video is skipped; and<br>with the host decoder, causing display of a given previous frame of the video in place of the current frame without invoking the accelerator to decode the current frame. |
| F2 | The method of claim F1 wherein the managing the at least some video decoding operations of the accelerator includes:<br>transferring, to the accelerator across the acceleration interface, data for one or more frames of the video for decoding by the accelerator, the one or more frames including the given previous frame. |
| F3 | The method of claim F1 wherein a reference frame area buffers the given previous frame, and wherein the causing display of the given previous frame includes changing a display indicator for the given previous frame. |

-continued

| # | Feature |
|---|---|
| F4 | The method of claim F3 wherein the reference frame area buffers multiple frames including the given previous frame, the method further comprising identifying the given previous frame among the multiple frames based on an identifier of the given previous frame that is signaled in the at least part of the bitstream for the current frame. |
| F5 | The method of claim F3 wherein the reference frame area buffers multiple frames including the given previous frame, the method further comprising identifying the given previous frame among the multiple frames based on display order, the given previous frame immediately preceding the current frame in display order. |
| F6 | The method of claim F1 wherein the determining that the current frame is skipped includes parsing, from the at least part of the bitstream, a syntax element that indicates whether or not the current frame is skipped. |
| F7 | The method of claim F6 further comprising, in response to the determining that the current frame is skipped, parsing, from the at least part of the bitstream, an identifier of the given previous frame. |
| F8 | The method of claim F1 wherein the managing at least some video decoding operations of the accelerator comprises: transferring, to the accelerator across the acceleration interface, data based at least in part on an uncompressed frame header for a given frame of the video, the data based at least in part on the uncompressed frame header being transferred in a first buffer; transferring, to the accelerator across the acceleration interface, a compressed frame header for the given frame, the compressed frame header being transferred in a second buffer different than the first buffer; and transferring, to the accelerator across the acceleration interface, compressed video data for the given frame, the compressed video data being transferred in the second buffer. |
| F9 | The method of claim F8 wherein the data based at least in part on the uncompressed frame header for the given frame includes surface index values that indicate reference frame assignments for the given frame. |
| F10 | The method of claim F8 wherein the data based at least in part on the uncompressed frame header for the given frame includes settings for decoding of the given frame, and wherein at least some of the settings override inconsistent values elsewhere in data for the given frame. |
| | G. Host Decoder Determining Settings that Override Syntax Element Values. |
| G1 | In a computer system that includes a host decoder and an accelerator in communication with the host decoder across an acceleration interface, a method comprising: at the host decoder, receiving at least part of a bitstream of encoded data for video; and with the host decoder, managing at least some video decoding operations of the accelerator, including: determining settings for decoding of a current frame of the video, wherein at least some of the settings override inconsistent values of syntax elements in the at least part of the bitstream; and transferring, to the accelerator across the acceleration interface, the settings for the decoding of the current frame. |
| G2 | The method of claim G1 wherein the at least some settings that override inconsistent values of syntax elements include settings to disable deblock filtering of block boundaries in the current frame. |
| G3 | The method of claim G2 further comprising: with the host decoder, determining that display resolution is below a threshold level; and in response to the determination that the display resolution is below the threshold level, determining the settings to disable deblock filtering of block boundaries in the current frame. |
| G4 | The method of claim G1 wherein the at least some settings that override inconsistent values of syntax elements include reference frame assignments for the current frame. |
| G5 | The method of claim G4 further comprising: with the host decoder, enabling error concealment or trick mode processing; and in response to error concealment or trick mode processing being enabled, determining the reference frame assignments for the current frame. |
| G6 | The method of claim G1 wherein the at least some settings that override inconsistent values of syntax elements include an indicator of whether or not to display the current frame after decoding. |
| G7 | The method of claim G6 further comprising: with the host decoder, enabling trick mode processing; and in response to trick mode processing being enabled, changing the indicator of whether or not to display the current frame after decoding. |

| # | Feature |
|---|---|
| G8 | The method of claim G1 wherein the settings are part of data based at least in part on an uncompressed frame header for the current frame, the data based at least in part on the uncompressed frame header being transferred in a first buffer, the managing at least some video decoding operations of the accelerator further comprising:<br>transferring, to the accelerator across the acceleration interface, a compressed frame header for the current frame, the compressed frame header being transferred in a second buffer different than the first buffer; and<br>transferring, to the accelerator across the acceleration interface, compressed video data for the current frame, the compressed video data being transferred in the second buffer. |
| G9 | The method of claim G1 further comprising:<br>with the host decoder, determining that a next frame of the video is skipped; and<br>with the host decoder, causing display of a given previous frame of the video in place of the next frame without invoking the accelerator to decode the next frame.<br>H. Accelerator Using Settings that Override Syntax Element Values. |
| H1 | In a computer system that includes a host decoder and an accelerator in communication with the host decoder across an acceleration interface, a method comprising:<br>at the accelerator, receiving, from the host decoder across the acceleration interface, settings for decoding of a current frame of video; and<br>with the accelerator, performing video decoding operations for the current frame, including using the settings to control at least some of the video decoding operations for the current frame, wherein at least some of the settings override inconsistent values elsewhere in data for the current frame. |
| H2 | The method of claim H1 wherein the at least some settings that override inconsistent values include settings to disable deblock filtering of block boundaries in the current frame. |
| H3 | The method of claim H1 wherein the at least some settings that override inconsistent values include reference frame assignments for the current frame. |
| H4 | The method of claim H1 wherein the at least some settings that override inconsistent values include an indicator of whether or not to display the current frame after decoding. |
| H5 | The method of claim H1 wherein the current frame is a non-key frame having a first spatial resolution, and wherein the performing the video decoding operations includes:<br>identifying a reference frame having a second spatial resolution different than the first spatial resolution;<br>allocating, in temporary internal memory, an uncompressed surface buffer;<br>scaling the reference frame to the first spatial resolution;<br>storing, in the uncompressed surface buffer, the scaled reference frame; and<br>performing motion compensation for at least some blocks of the current frame relative to portions of the scaled reference frame. |
| H6 | The method of claim H1 wherein the settings are part of data based at least in part on an uncompressed frame header for the current frame, the data based at least in part on the uncompressed frame header being received in a first buffer, the method further comprising:<br>receiving, from the host decoder across the acceleration interface, a compressed frame header for the current frame, the compressed frame header being received in a second buffer different than the first buffer; and<br>receiving, from the host decoder across the acceleration interface, compressed video data for the current frame, the compressed video data being received in the second buffer. |

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computer system that includes a host decoder and an accelerator in communication with the host decoder across an acceleration interface, a method comprising:
   at the host decoder, receiving at least part of a bitstream of encoded data for video; and
   with the host decoder, managing at least some video decoding operations of the accelerator across the acceleration interface, including:
   parsing, from the at least part of the bitstream, an uncompressed frame header for a current frame of the video;
   transferring, to the accelerator across the acceleration interface, data based at least in part on the uncompressed frame header in a first buffer; and
   transferring, to the accelerator across the acceleration interface, a compressed frame header for the current frame in a second buffer different than the first buffer, wherein the compressed frame header includes entropy-coded data indicating probabilities of values of entropy-coded syntax elements for the current frame.

2. The method of claim 1 wherein the data based at least in part on the uncompressed frame header includes:
   settings for decoding tools that apply for the current frame;

reference frame assignments for the current frame;
settings for inverse quantization of quantized transform coefficients of the current frame;
settings for deblock filtering of block boundaries in the current frame; and
segmentation parameters for blocks of the current frame, wherein the segmentation parameters include a segmentation map that segments the blocks of the current frame into multiple different segments.

3. The method of claim 1 wherein the managing the at least some video decoding operations of the accelerator further comprises:
transferring, to the accelerator across the acceleration interface, compressed frame data for the current frame in the second buffer.

4. The method of claim 3 wherein the compressed frame data includes one or more of:
mode data for blocks of the current frame;
motion vector data for blocks of the current frame;
quantized transform coefficient data for blocks of the current frame; and
other data for blocks of the current frame.

5. The method of claim 3 wherein the managing the at least some video decoding operations of the accelerator further comprises:
transferring, to the accelerator across the acceleration interface, the uncompressed frame header in the second buffer along with the compressed frame header and the compressed frame data, wherein a variable in the data based at least in part on the uncompressed frame header indicates size of the uncompressed frame header, thereby helping the accelerator skip parsing of the uncompressed frame header in the second buffer.

6. The method of claim 1 wherein the data based at least in part on the uncompressed frame header for the current frame includes surface index values that indicate reference frame assignments for the current frame.

7. The method of claim 1 wherein the data based at least in part on the uncompressed frame header for the current frame includes settings for decoding of the current frame, and wherein at least some of the settings override inconsistent values of syntax elements in the uncompressed frame header for the current frame.

8. An accelerator comprising a device driver and accelerator hardware, wherein the accelerator is configured to perform operations of the accelerator in a computer system that includes a host decoder in communication with the accelerator across an acceleration interface, the operations of the accelerator comprising:
receiving, from the host decoder across the acceleration interface, settings for decoding of a current frame of video;
receiving, from the host decoder across the acceleration interface, portions of a video elementary bitstream for the current frame; and
performing video decoding operations for the current frame, including using the settings to control at least some of the video decoding operations for the current frame, wherein at least some of the settings override one or more inconsistent values among syntax elements in the received portions of the video elementary bitstream for the current frame.

9. The accelerator of claim 8 wherein the at least some settings that override the one or more inconsistent values include settings to disable deblock filtering of block boundaries in the current frame.

10. The accelerator of claim 8 wherein the at least some settings that override the one or more inconsistent values include reference frame assignments for the current frame.

11. The accelerator of claim 8 wherein the at least some settings that override the one or more inconsistent values include an indicator of whether or not to display the current frame after decoding.

12. The accelerator of claim 8 wherein the current frame is a non-key frame having a first spatial resolution, and wherein the performing the video decoding operations includes:
identifying a reference frame having a second spatial resolution different than the first spatial resolution;
allocating, in temporary internal memory, an uncompressed surface buffer;
scaling the reference frame to the first spatial resolution;
storing, in the uncompressed surface buffer, the scaled reference frame; and
performing motion compensation for at least some blocks of the current frame relative to portions of the scaled reference frame.

13. The accelerator of claim 8 wherein the settings are part of data based at least in part on an uncompressed frame header for the current frame, the data based at least in part on the uncompressed frame header being received in a first buffer, wherein the received portions of the video elementary bitstream are received in a second buffer different than the first buffer, and wherein the received portions of the video elementary bitstream for the current frame include the uncompressed frame header, a compressed frame header for the current frame, and compressed video data for the current frame.

14. In a computer system that includes a host decoder and an accelerator in communication with the host decoder across an acceleration interface, a method comprising:
at the accelerator, receiving in a first buffer, from the host decoder across the acceleration interface, data based at least in part on an uncompressed frame header for a current frame of video;
at the accelerator, receiving in a second buffer different than the first buffer, from the host decoder across the acceleration interface, a compressed frame header for the current frame, wherein the compressed frame header includes entropy-coded data indicating probabilities of values of entropy-coded syntax elements for the current frame; and
with the accelerator, performing video decoding operations using the data based at least in part on the uncompressed frame header and the compressed frame header.

15. The method of claim 14 wherein the data based at least in part on the uncompressed frame header includes:
settings for decoding tools that apply for the current frame;
reference frame assignments for the current frame;
settings for inverse quantization of quantized transform coefficients of the current frame;
settings for deblock filtering of block boundaries in the current frame; and
segmentation parameters for blocks of the current frame, wherein the segmentation parameters include a segmentation map that segments the blocks of the current frame into multiple different segments.

16. The method of claim 14 further comprising:
at the accelerator, receiving in the second buffer, from the host decoder across the acceleration interface, the uncompressed frame header and compressed frame data for the current frame, wherein a variable in the data based at least in part on the uncompressed frame header indicates size of the uncompressed frame header; and as part of the performing video decoding operations, using the variable to skip parsing of the uncompressed frame header in the second buffer.

17. One or more computer-readable media storing computer-executable instructions for causing one or more processing units, when programmed thereby, to perform operations of a host decoder in a computer system that includes an accelerator in communication with the host decoder across an acceleration interface, the operations of the host decoder comprising:

receiving at least part of a video elementary bitstream of encoded data for video, the at least part of the video elementary bitstream including portions of the video elementary bitstream for a current frame of the video; and managing at least some video decoding operations of the accelerator, including:
determining settings for decoding of the current frame, wherein at least some of the settings override one or more inconsistent values among syntax elements in the portions of the video elementary bitstream for the current frame;
transferring, to the accelerator across the acceleration interface, the settings for the decoding of the current frame; and
transferring, to the accelerator across the acceleration interface, the portions of the video elementary bitstream for the current frame.

18. The one or more computer-readable media of claim 17 wherein the at least some settings that override the one or more inconsistent values include settings to disable deblock filtering of block boundaries in the current frame.

19. The one or more computer-readable media of claim 18 wherein the managing the at least some video decoding operations of the accelerator further comprises:
determining that display resolution is below a threshold level; and
in response to the determination that the display resolution is below the threshold level, determining the settings to disable deblock filtering of block boundaries in the current frame.

20. The one or more computer-readable media of claim 17 wherein the at least some settings that override the one or more inconsistent values include reference frame assignments for the current frame.

21. The one or more computer-readable media of claim 20 wherein the managing the at least some video decoding operations of the accelerator further comprises:
enabling error concealment or trick mode processing; and
in response to error concealment or trick mode processing being enabled, determining the reference frame assignments for the current frame.

22. The one or more computer-readable media of claim 17 wherein the settings are part of data based at least in part on the uncompressed frame header being transferred to a first buffer, wherein the portions of the video elementary bitstream for the current frame are transferred to a second buffer different than the first buffer, and wherein the portions of the video elementary bitstream for the current frame include the uncompressed frame header, a compressed frame header for the current frame, and compressed video data for the current frame.

23. One or more computer-readable media storing computer-executable instructions for causing one or more processing units, when programmed thereby, to perform operations of a host decoder in a computer system that includes an accelerator in communication with the host decoder across an acceleration interface, the operations of the host decoder comprising:

receiving at least part of a bitstream of encoded data for video; and managing at least some video decoding operations of the accelerator across the acceleration interface, including:
parsing, from the at least part of the bitstream, an uncompressed frame header for a current frame of the video;
transferring, to the accelerator across the acceleration interface, data based at least in part on the uncompressed frame header in a first buffer, wherein a variable in the data based at least in part on the uncompressed frame header indicates size of the uncompressed frame header, thereby helping the accelerator skip parsing of the uncompressed frame header in a second buffer different than the first buffer; and
transferring, to the accelerator across the acceleration interface, in the second buffer, the uncompressed frame header, a compressed frame header for the current frame, and compressed frame data for the current frame.

24. The one or more computer-readable media of claim 23 wherein the compressed frame header includes entropy-coded data indicating probabilities of values of entropy-coded syntax elements for the current frame.

25. The one or more computer-readable media of claim 23 wherein the data based at least in part on the uncompressed frame header includes settings for decoding of the current frame, and wherein at least some of the settings override inconsistent values of syntax elements in the uncompressed frame header for the current frame.

26. An accelerator comprising a device driver and accelerator hardware, wherein the accelerator is configured to perform operations of the accelerator in a computer system that includes a host decoder in communication with the accelerator across an acceleration interface, the operations of the accelerator comprising:

receiving in a first buffer, from the host decoder across the acceleration interface, data based at least in part on an uncompressed frame header for a current frame of video, wherein a variable in the data based at least in part on the uncompressed frame header indicates size of the uncompressed frame header;

receiving in a second buffer different than the first buffer, from the host decoder across the acceleration interface, the uncompressed frame header, a compressed frame header for the current frame, and compressed frame data for the current frame; and performing video decoding operations using the data based at least in part on the uncompressed frame header, the compressed frame header, and the compressed frame data, including using the variable to skip parsing of the uncompressed frame header in the second buffer.

27. The accelerator of claim 26 wherein the data based at least in part on the uncompressed frame header includes:
settings for decoding tools that apply for the current frame;
reference frame assignments for the current frame;
settings for inverse quantization of quantized transform coefficients of the current frame;
settings for deblock filtering of block boundaries in the current frame; and segmentation parameters for blocks of the current frame, wherein the segmentation parameters include a segmentation map that segments the blocks of the current frame into multiple different segments.

28. The accelerator of claim 26 wherein the compressed frame header includes entropy-coded data indicating probabilities of values of entropy-coded syntax elements for the current frame.

29. The accelerator of claim 26 wherein the data based at least in part on the uncompressed frame header for the current frame includes settings for decoding of the current frame, and wherein at least some of the settings override inconsistent values of syntax elements in the uncompressed frame header for the current frame.

* * * * *